US007143103B1

(12) United States Patent
Zisman et al.

(10) Patent No.: US 7,143,103 B1
(45) Date of Patent: Nov. 28, 2006

(54) METHOD AND APPARATUS FOR MONITORING AND MAINTAINING THE CONSISTENCY OF DISTRIBUTED DOCUMENTS

(75) Inventors: Andrea Zisman, London (GB); Anthony Finkelstein, London (GB); Ernst Ellmer, London (GB); Danila Smolko, London (GB); Wolfgang Emmerich, London (GB)

(73) Assignee: University College London, London (GB)

( * ) Notice: Subject to any disclaimer, the term of this patent is extended or adjusted under 35 U.S.C. 154(b) by 423 days.

(21) Appl. No.: 10/009,722

(22) PCT Filed: Jun. 15, 2000

(86) PCT No.: PCT/GB00/02336

§ 371 (c)(1),
(2), (4) Date: May 22, 2002

(87) PCT Pub. No.: WO00/79428

PCT Pub. Date: Dec. 28, 2000

(30) Foreign Application Priority Data

Jun. 18, 1999 (GB) ................................. 9914232.5

(51) Int. Cl.
*G06F 17/30* (2006.01)

(52) U.S. Cl. ...................... 707/102; 707/100; 707/101; 707/103 R; 707/104.1; 715/500

(58) Field of Classification Search ................ 707/102, 707/100, 101, 103 R, 104.1; 715/500

See application file for complete search history.

(56) References Cited

U.S. PATENT DOCUMENTS

| 4,141,078 | A | * | 2/1979 | Bridges et al. | ............. | 235/375 |
| 4,153,931 | A | * | 5/1979 | Green et al. | ............. | 707/104.1 |
| 5,008,853 | A | * | 4/1991 | Bly et al. | ................... | 715/751 |
| 5,228,980 | A | * | 7/1993 | Stockwell et al. | ...... | 208/120.15 |
| 5,251,315 | A | * | 10/1993 | Wang | ............................. | 707/8 |
| 5,333,312 | A | * | 7/1994 | Wang | .......................... | 707/10 |
| 5,581,753 | A | | 12/1996 | Terry et al. | ................. | 395/617 |
| 5,623,659 | A | * | 4/1997 | Shi et al. | ........................ | 707/8 |
| 5,694,594 | A | * | 12/1997 | Chang | ............................ | 707/6 |
| 5,715,403 | A | * | 2/1998 | Stefik | ........................... | 705/44 |

(Continued)

FOREIGN PATENT DOCUMENTS

EP        0 635 794 A2    1/1995

(Continued)

OTHER PUBLICATIONS

T. Kitazawa, et al., "Intelligent Document Generation System for Construction Planning", The Eighth Conference on Artificial Intelligence for Applications, IEEE Computer Society Press, pp. 14-19, Mar. 2, 1992.

(Continued)

*Primary Examiner*—Frantz Coby
(74) *Attorney, Agent, or Firm*—Finnegan, Henderson, Farabow, Garrett & Dunner, L.L.P.

(57) ABSTRACT

A computer network comprising a plurality of terminals (1–4) connected via a communications network 5 is provided. In each of the terminals (1–4) application software (15) for generating XML source documents is provided. XML source documents created using the application software (15) are then sent to one of the terminals (4) having stored therein a consistency checker (10). The consistency checker (10) processes the source document together with a set of consistency rules (14) to generate an output presentation identifying data within the source documents which does or does not fulfil the requirements of consistency relationships defined by the consistency rules (14).

36 Claims, 16 Drawing Sheets

U.S. PATENT DOCUMENTS

| | | | | |
|---|---|---|---|---|
| 5,734,823 | A | * | 3/1998 | Saigh et al. ............... 709/229 |
| 5,774,670 | A | * | 6/1998 | Montulli ..................... 709/227 |
| 5,835,758 | A | * | 11/1998 | Nochur et al. ............. 707/102 |
| 5,860,007 | A | | 1/1999 | Soni et al. .................. 395/703 |
| 5,884,298 | A | * | 3/1999 | Smith et al. .................... 707/2 |
| 5,966,707 | A | * | 10/1999 | Van Huben et al. .......... 707/10 |
| 6,052,514 | A | * | 4/2000 | Gill et al. .................... 715/733 |
| 6,061,697 | A | * | 5/2000 | Nakao ........................ 715/513 |
| 6,175,834 | B1 | * | 1/2001 | Cai et al. .................... 707/102 |
| 6,185,563 | B1 | * | 2/2001 | Hino .............................. 707/8 |
| 6,212,530 | B1 | * | 4/2001 | Kadlec ........................ 707/201 |
| 6,349,302 | B1 | * | 2/2002 | Aoyama et al. ............ 707/101 |
| 6,490,603 | B1 | * | 12/2002 | Keenan et al. .............. 715/513 |

FOREIGN PATENT DOCUMENTS

| | | |
|---|---|---|
| EP | 0 694 835 A1 | 1/1996 |
| EP | 0 807 892 A2 | 11/1997 |
| GB | 2 316 201 A | 2/1998 |
| WO | WO97/34240 | 9/1997 |
| WO | WO97/35265 | 9/1997 |

OTHER PUBLICATIONS

L. Carr, et al., "Open Information Services", Computer Networks and ISDN Systems 28, pp. 1027-1036, (1996).

A. Hsu, et al., "Hilda:An Integrated System Design Environment", 1987 IEEE International Conference on computer Design VLSI in Computers & Processors, pp. 398-402, (1987).

* cited by examiner

METHOD AND APPARATUS FOR MONITORING AND MAINTAINING THE CONSISTENCY OF DISTRIBUTED DOCUMENTS

TECHNICAL FIELD

This invention relates to methods and apparatus for monitoring and maintaining the consistency of documents having related overlapping content, for example documents in which the content is represented using XML (extensible Markup Language) and other related technologies.

BACKGROUND TO THE INVENTION

Documents can either be created by individuals or by a group of individuals. Different documents created can be related or have overlapping content in that they relate to common objects and phenomena. In such circumstances, required relationships between data in one document and data in the same or other documents may be formalised as a set of consistency rules defining those relationships.

An example of a simple consistency rule might be that data in one document which also appears in another document is considered to relate to the same object or phenomena. More complex formal relationships can exist within documents such as design specification documents which are intended to contain data which is represented in different documents in different ways in a pre-defined manner.

In circumstance where new documents, document types and consistency rules may be added at any time it becomes difficult to ensure that, during the production of a set of documents, the set of documents fulfils all of the requirements of a formal set of consistency rules at relevant key points within the production process. This is particularly the case since during the production of a set of documents, it is inevitable that on occasions some consistency rules will not be satisfied. Thus for example where it is required that data present in one document also appears in another, when data is initially entered for the first document the other document may not immediately reflect the change made to the first document.

Where documents are generated in distributed organisations by large numbers of individuals it becomes impractical to limit the production of documents to ways which ensure as far as is possible that the consistency of a set of documents is constantly maintained. Also, with large sets of documents it becomes very difficult for formal consistency relationships to be checked manually as searching through the data of a large set of documents is time consuming and errors occur.

The present invention aims to provide a means by which data which is intended to comply with formal consistency relationships defined by a set of consistency rules can be monitored whilst tolerating the entry of data which does not fulfil the required relationships.

In accordance with one aspect of the present invention there is provided a computer apparatus comprising:
  means for generating a first set of structured documents containing data;
  means for defining a set of consistency rules defining relationships which are intended to be fulfilled by the data within the first set of documents; and
  means for generating a second set of documents containing data of said first set of documents, wherein the data of the second set of documents is linked on the basis of whether said data does or does not fulfil the relationships defined by said consistency rules.

By providing means by which a linked set of documents can be generated, users are then able to view data which either fulfils or does not fulfil a consistency rule in the context of the document where that data appears.

DISCLOSURE OF THE INVENTION

In accordance with another aspect of the present invention there is provided computer apparatus comprising:
  means for inputting documents containing data;
  means for inputting a set of consistency rules defining relationships which should be fulfilled by data in said documents; and
  means for generating consistency links identifying data in said documents which does and does not fulfil the formal relationships defined by said consistency rules.

Embodiments of the present invention enable the documents and generated consistency links to be viewed by a user in a number of different ways in order to help a user identify why data within a set of documents does or does not fulfil a defined set of relationships.

BRIEF DESCRIPTION OF THE DRAWINGS

Embodiments of the present invention will now be described by way of example with reference to the accompanying drawings in which.

EMBODIMENTS

Figure 1:
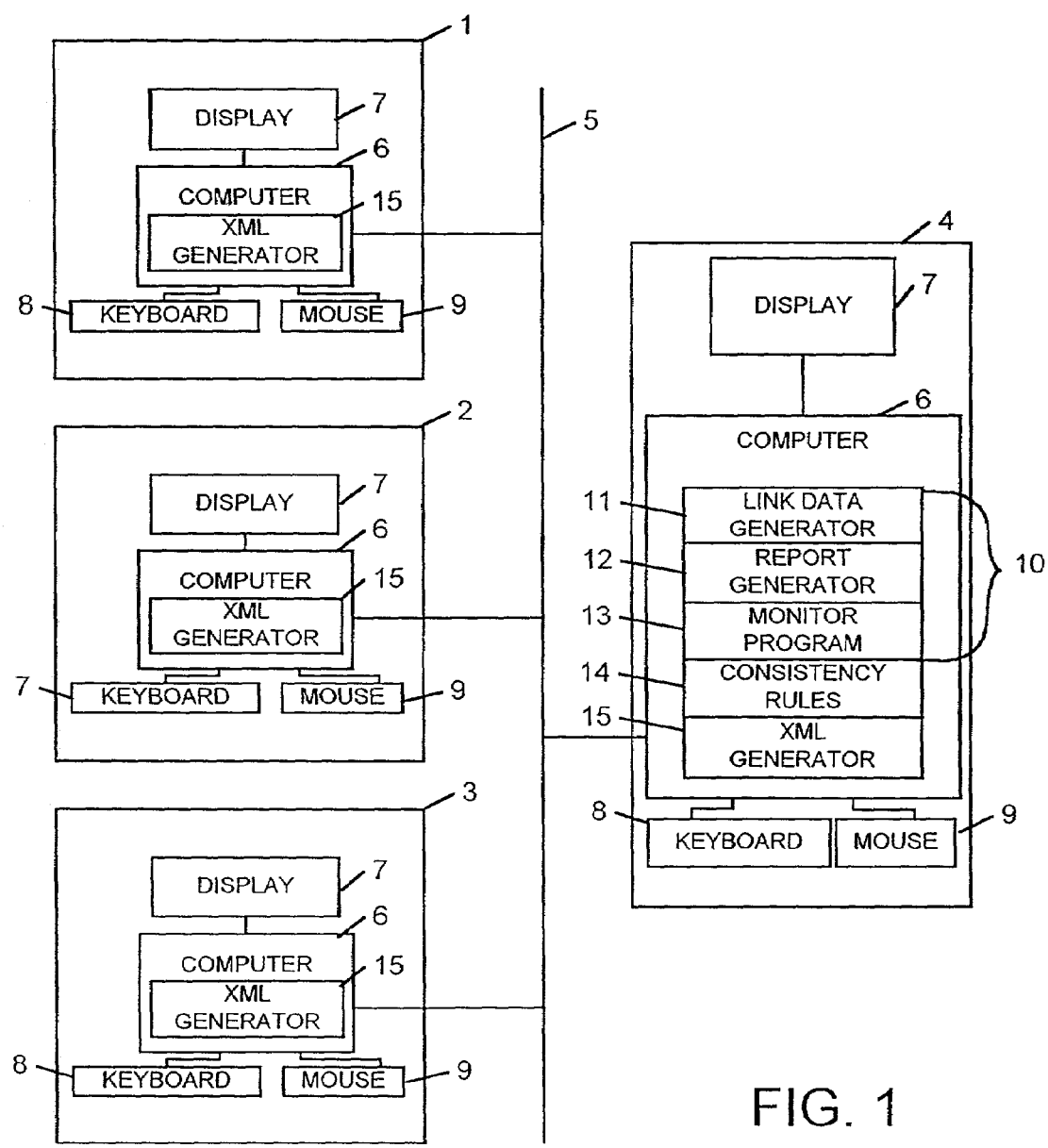
FIG. 1 is a block diagram of a computer network embodying the present invention.

In the following description, the present invention is described in terms of an XML (extensible Markup Language) implementable software system. XML is a data description language which is a sub set of SGML (Standard Generalised Markup Language) which has been standardised by the Worldwide Web Consortium (W3C). XML has been generated in view of the main problems involved in hard coding presentation information and linking information into documents using HTML (Hyper Text Markup Language).

In contrast to HTML in which content, presentational information and link information are all encoded in a single document, in XML the structure of a document, how it is linked to other documents and how it is presented to a user can be separated.

In XML, before a document is created a DTD (Document Type Definition) is created which defines a data structure for a document. This comprises a set of rules defining how documents and tags are to be structured, which elements are presented and the structural relationship between the elements for documents of a particular type.

A very simple example of a document type definition for a book might be that a book comprises one or more pages, each page having one or more paragraphs, each paragraph comprising one or more sentences, each of the sentences comprising a number of words and ending with a full stop. Documents of the data type book would then be instances of data structured in the manner determined by the book DTD.

XML also provides a means by which different parts of data structured in accordance with DTD can be linked to one another, known as XML linking or X link. An X link comprises a definition of where data which is to be linked is located. An X link defines the location of data in terms of a computer file for a structured document and where within that structured document the data is to be found. The structure of an X Link can itself be defined in XML by a DTD as consisting of two parts, a URL (Universal Resource Locator) identifying the file containing data which is to be linked and an optional X-pointer expressing where within a document structured in accordance with a DTD the link is to point to. Thus, for a document defined in terms of the above simple book DTD example, an X Link would comprise a URL identifying a particular book document and an X-pointer to a particular word in that book in terms of which page, paragraph, sentence and where within a sentence that word appears.

The presentation of an output XML document is defined using XSL (extensible Style Language). XSL is used to define description of the mapping between the content elements of an XML document and presentation elements which are to be output. An XSL file describing a mapping from content elements to presentation elements is known as an XSL style sheet. An output is then generated by using an XSL style sheet processor which processes XML documents to generate an output by applying the mapping defined by an XSL style sheet. In this way by providing different XSL style sheets an XML document can be translated between different formats. Thus an XSL style sheet may define how an XML document is to be displayed in for example HTML (Hyper Text Markup Language) so that an XML document may be viewed within a standard browser.

An embodiment of the present invention will now be described in which FIG. 1 is a block diagram of a distributed computer network embodying the present invention. In this embodiment the distributed computer network comprises a plurality of computer terminals 1, 2, 3, 4 connected to each other via a communications network 5. Each of the computer terminals 1–4 comprises a computer 6 that is connected to a display 7. Also connected to each computer 5 is a keyboard 8 and a mouse 9.

Stored within the memory of one of the computer terminals 4 of the network of FIG. 1 is a consistency checker program in accordance with the present invention. The consistency checker program 10 comprises a link data generator 11, a report generator 12 and a monitor program 13 as will be described in detail later. Also stored in the memory of the computer 6 is a set of consistency rules 14 defining a set of relationships that data in documents are required to fulfil as will also be described below. Further programs and data (not shown in FIG. 1) are also stored in the memory of the computer 6 as are detailed later.

In this embodiment of the present invention, stored within the memory of the computers 6 of all of the terminals 1–4 is application software 15 for generating XML (extensible Markup Language) source documents for UML (unified modelling language) software design diagrams, using the keyboard 8 and the mouse 9 of the terminals 1–4. The application software 15 is arranged to enable users to generate UML design documents and to store these documents in the form of XML source documents in the memory of the computer 6 of terminals 1–4 on which they are located.

In accordance with the present embodiment, users generate a set of XML source documents for UML software design diagrams using the application software 15 on each of the terminals 1–4. These XML source documents are then transferred via the communications network 5 to the terminal 4 of the distributed computer network having stored in its memory the consistency checker program 10. The XML source documents are then processed by the link data generator program 11 in accordance with the set 14 of consistency rules to generate a set of XML consistency link elements, representing links between data in the source documents linked in accordance with the consistency rules 14. The XML source documents, XML consistency link elements and consistency rules are then processed by the report generator 12 to generate HTML output documents including HTML links so that data within the set of output documents may be navigated by a user so as to view data within the documents linked in accordance with whether the data in the documents does or does not fulfil the formal relationships defined by the consistency rules.

The processing of the consistency checker 10 will now be described with reference to FIG. 2 which illustrates an exemplary set of UML design documents that might be generated using the application software 15 stored in the computers 6 of the terminals 1–4 of the network of FIG. 1. This exemplary set of design documents comprises a business entities class diagram 1000 and a create meeting collaboration diagram 2000 for the design of software for a simple meeting scheduler system.

In this set of documents, the business entities class diagram 1000 illustrates the interaction of classes in the meeting software which is to be created in accordance with the design. Each of the classes represents data structures that can be fulfilled by specific instances of data created during the course of the use of the meeting scheduler software. The classes in this example comprise a user class 1001, a message class 1002, a meeting class 1003 a location class 1004; a date class 1005, an organiser class 1006, and a participant class 1007. The business entities class diagram 1000 also illustrates how the different classes relate to each other. Thus in this example the user class 1001 is a data structure for each user comprising a password, name and e-mail address. The participant 1007 and user 1006 classes are sub-classes of the user class 1001 and have the same data structure. The message class 1002 is a data structure for message data which relates to a message sent between users about meetings. The meeting class 1003 is a data structure for data about the name and status of a meeting and which is related to messages about a meeting, an organiser, one or more participants, a date and a location. The date and location merely in terms of a date and a time period and a location for a meeting respectively.

The create meeting collaboration diagram 2000 of the illustrated set of documents is a diagram illustrating the steps and interactions which occur when a specific meeting is to be set up. The create meeting collaboration diagram 2000 in this example includes a set 2001–2004 of instances representing the specific examples of data of certain types which interact when a meeting is set up using the proposed software in accordance with a design. The instances in this example comprise an organiser window 2001, an organiser 2002, a meeting 2003 and a date 2004. Thus in this example an organiser window is used which generates meeting data which is sent to an organiser and causes a calender to be updated.

After the set of design documents 1000,2000 has been generated using the application software of 15 and the XML corresponding to the those documents has been generated they are made available to the consistency checker 10 via the communications network 5. The consistency checker 10 is then able to generate consistency links in accordance with a set of consistency rules 14 stored in memory defining required relationships between data in the documents created.

An example of the processing by the consistency checker will now be described in which we consider the processing of a set of consistency rules 14 comprising a single consistency rule 14 defining a relationship that data within UML design documents are required to fulfil. The exemplary consistency rule which is considered is a rule that: "For every instance in a collaboration diagram there must exist a class in a class diagram of the same name". This rule defines a formal requirement of a UML design document that where a specific instance of data is shown as a specific type interaction in a collaboration diagram the general overview of how data of that type interacts with data of other classes should also be represented in the set of design documents.

When processing a set of consistency rules, the consistency checker 10 initially invokes the link data generator 11 which identifies from the XML source for the design documents 1000,2000 all data in the collaboration diagram 2000 which correspond to instances 2001–2004 in the collaboration diagram 2000 as data which is required to fulfil the conditions of the consistency rule 14. The link data generator 11 then identifies all of the data in the business entities class diagram 1000 which corresponds to classes, as potential data which may satisfy the condition of the consistency rule. The way in which the data corresponding to classes and instances is identified will be described in detail later. Both of the sets of identified data are then stored in memory in the computer 6 of the terminal 4.

The link data generator 11 then generates a set of XML link elements (X links) corresponding to consistency relations in the UML design documents 1000,2000 using the consistency rules. This is achieved by the link data generator 11 testing each piece of data identified as possibly relevant against the condition of the consistency rule under consideration, and then generating appropriate link elements depending upon the outcome of the tests.

Thus in this example the link data generator 11 would test all of the instances 2001–2004 in the collaboration diagram 2000 to see if any class data 1001–1007 in the business entity diagram 1000 has the same name. Whenever data within the collaboration diagram 2000 is matched with data from the class diagram 1000, link elements are generated identifying the two pieces of data and a status is assigned to the link to indicate that these pieces of data fulfil the requirements of the consistency rule under consideration. If data from the collaboration diagram 2000 cannot be matched, a link element is generated labelling the data as inconsistent with respect to the consistency rule under consideration.

Thus in the present example the following XML link elements would be generated.

| Data from Collaboration Diagram 2000 | Data from Class Diagram 1000 | Status |
|---|---|---|
| Organiser Window Instance 2001 | None | Inconsistent |
| Organiser Instance 2002 | Organiser class 1006 | Consistent |
| Meeting Instance 2003 | Meeting class 1003 | Consistent |
| Date Instance 2004 | Date class 1005 | Consistent |

The XML link elements, consistency rules 15 and source documents are then passed to the report generator 12 to generate an output. In this embodiment the presentation report generator 12 is composed of a style sheet processor and a set of construction rules. The construction rules are applied to the XML source documents, consistency rules and XML link elements using the style sheet processor to generate HTML (Hypertext Markup Language) documents.

In the current example the HTML documents generated by the report generator 12 would be HTML representations of the XML source documents for the UML design diagrams 1000,2000. In addition these HTML documents also include HTML links between data identified by the XML link elements generated by the link data generator 11 which is or is not consistent with the set of consistency rules and HTML labels labelling data as consistent or inconsistent.

Figure 2:
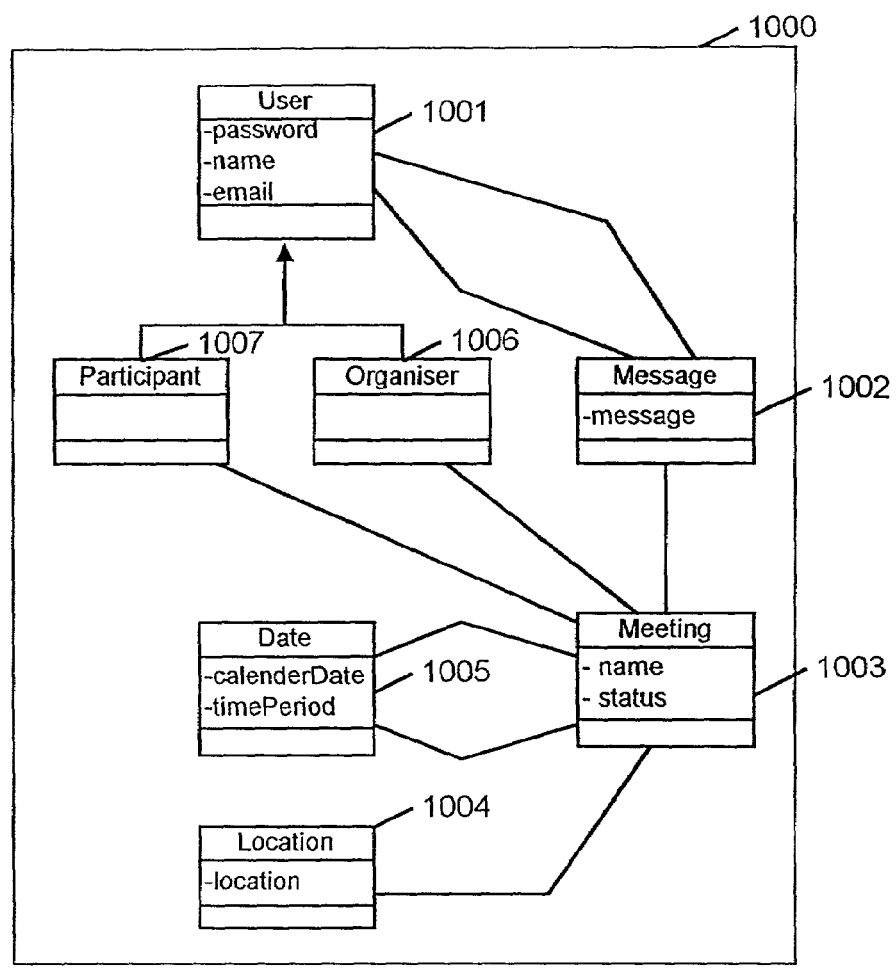
FIG. 2 is an example of a set of design documents having overlapping content for which a consistency report could be generated.
Figure 2:
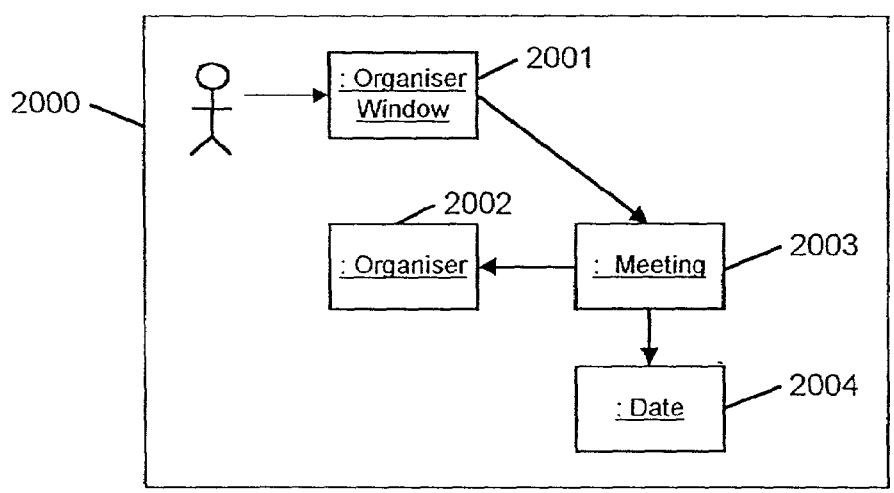
Figure 3:
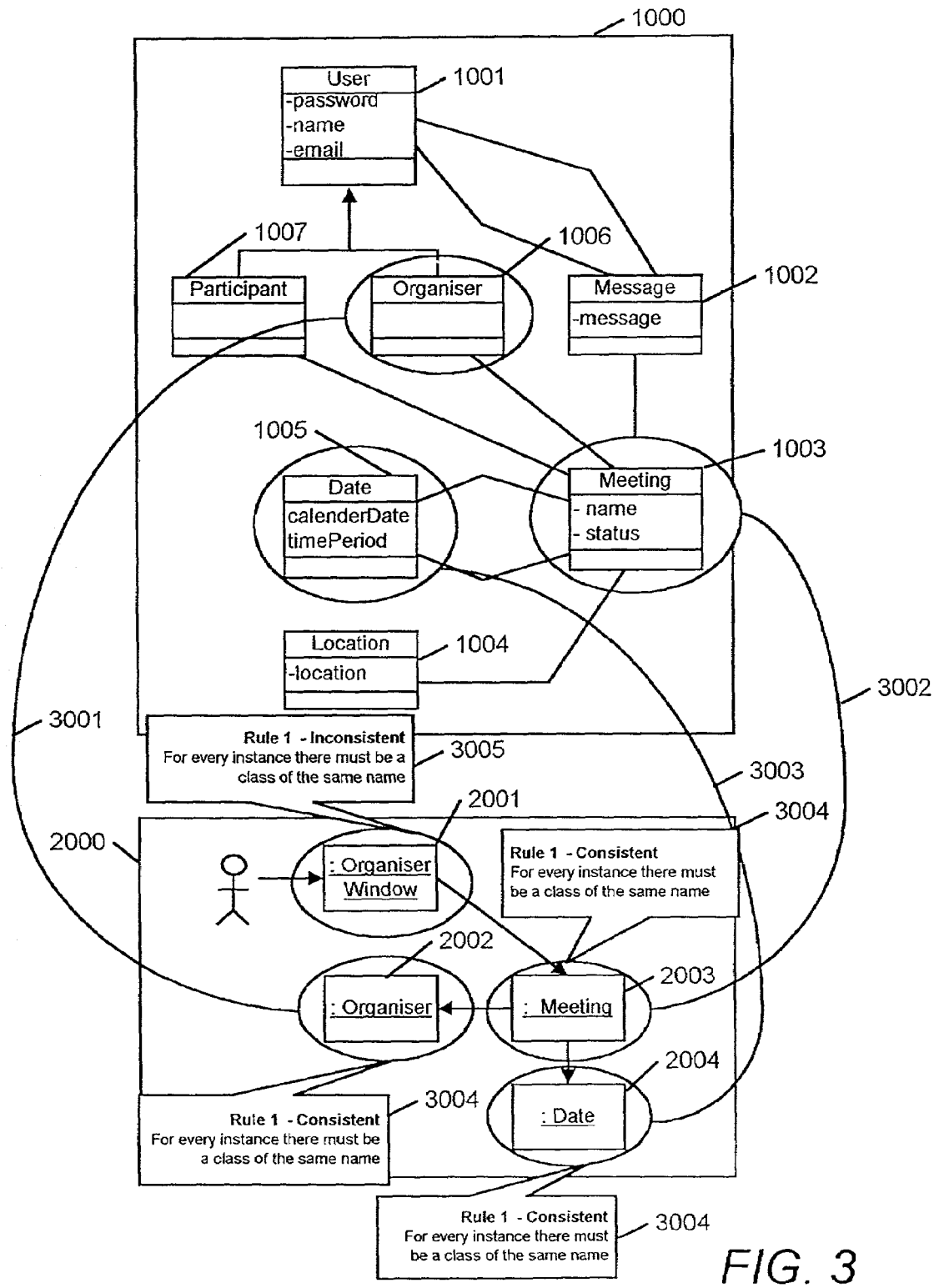
FIG. 3 is a diagrammatic representation illustrating an example of a consistency report generated for the set of design documents of FIG. 2 comprising a set of linked documents with data within the documents linked in accordance with a formal relationship defined by an exemplary consistency rule.

FIG. 3 is a diagrammatic representation illustrating a consistency report for the set of documents of FIG. 2. FIG. 3 shows a set of linked HTML documents 1000,2000 comprising HTML representations of the documents 1000, 2000 of FIG. 2 linked by HTML links in accordance with the consistency rule that for every instance in a collaboration diagram there must exist a class in a class diagram of the same name.

The links in a generated consistency report comprise HTML links to other data. The HTML links appear within the output document and cause the data identified by a link to be displayed when the link is selected. In FIG. 3 the HTML links are shown as lines connecting data in different documents. In this example the HTML links comprise a link 3001 between the organiser instance 2002 of the create meeting collaboration diagram 2000 and the organiser class 1006 of the business entities class diagram 1000, a link 3002 between the meeting instance 2003 of the create meeting collaboration diagram 2000 and the meeting class 1003 of the business entities class diagram 1000, and a link 3003 between the date instance 2004 of the create meeting collaboration diagram 2000 and the date class 1005 of the business entities class diagram 1000.

All of the data in the collaboration diagram linked to data in the class diagram is also labelled by an HTML label which is displayed when a user selects the linked data which indicates why the links have been generated. Thus in the present example all of the linked data 2002–2004, is labelled with an HTML label indicating that the data is consistent with the consistency rule that for every instance in a collaboration diagram there must exist a class diagram of the same name. An HTML label is a label which is displayed whenever the data which is labelled is selected. In FIG. 3 the HTML labels indicating that data is consistent with the consistency rule are shown as speech bubbles 3004 detailing the information which would appear when the labelled data is selected.

No link is generated to the organiser window 2001 to data in the business entities class diagram 1000 for which no corresponding class exists. However the data is labelled 3005 in HTML to indicate that the data is inconsistent with the consistency rule.

By generating a linked and labelled set of documents, a user can view data which has been linked within the context of each document and is aided in establishing why data is or is not consistent with the requirements of a set of consistency rules.

Figure 4:
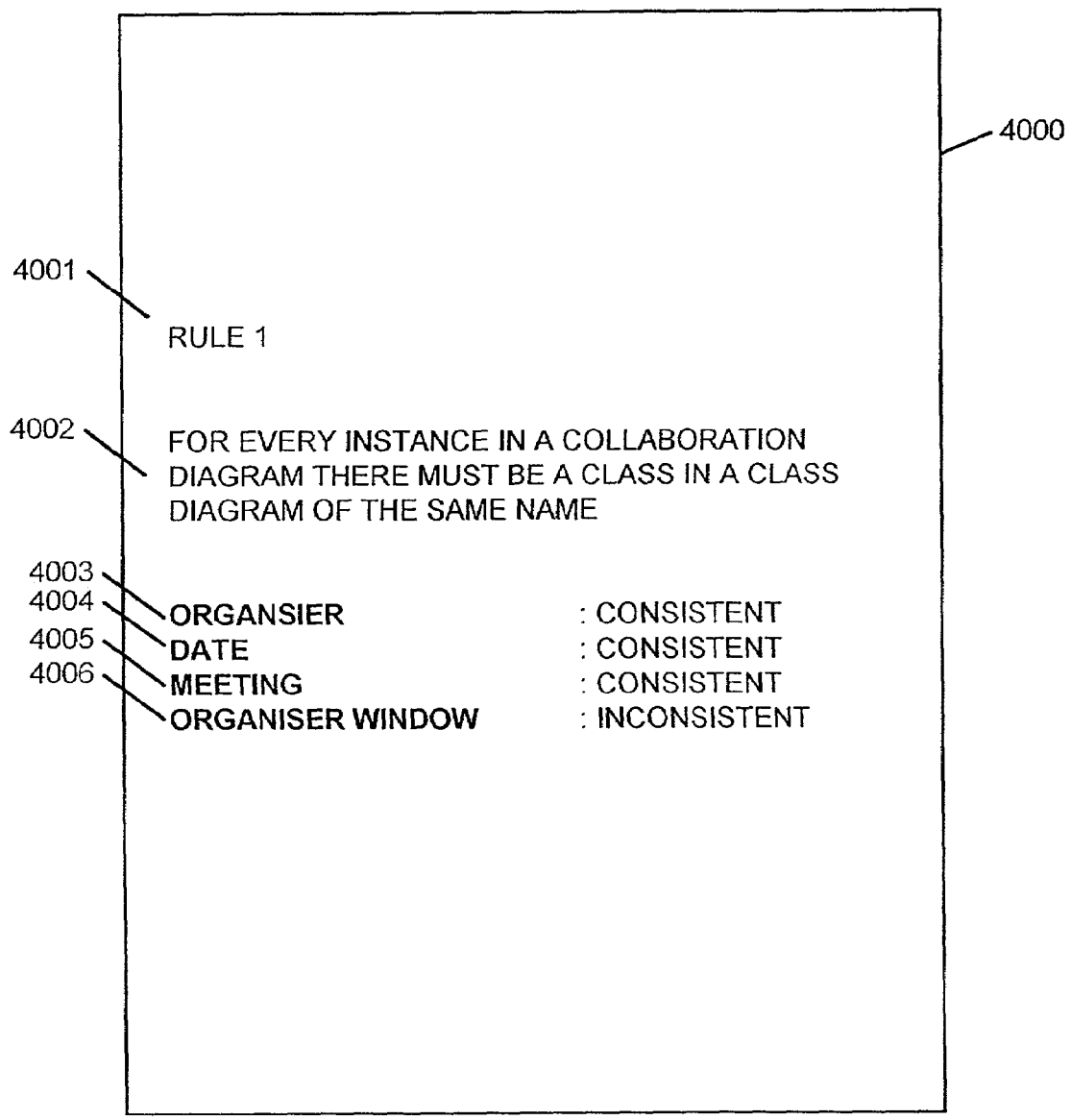
FIG. 4 is another example of a consistency report generated for the design documents of FIG. 2 comprising a report identifying data which does and does not comply with a formal relationship defined by an exemplary consistency rule.

FIG. 4 is an illustration of an alternative representation for the output presentation for the documents of FIG. 2 in which the link elements and consistency rules have been processed in accordance with a different XSL style sheet. In this example the output presentation comprises a consistency report 4000. The consistency report 4000 comprises for each of the rules of the set of consistency rules 14 in memory, a rule identification 4001, a definition of the rule 4002 and a list 4003–4006 of data to which the rule is applicable for which links have been generated together with labels as to whether the data is or is not consistent with the rule.

Thus, the consistency report for the documents of FIG. 2 therefore comprises a rule identification 4001, a definition 4002 of that rule for every instance in the collaboration diagram there must exist a class in a class diagram of the same name and a set 4003–4006 of data corresponding to each of the instances 2001–2004 in the create meeting collaboration diagram to which this rule is applicable and a label indicating whether the link is generated for that instance of data are consistent or inconsistent with the condition for the rule identified by the identification data.

In this example the data 4003–4005 comprising meeting, date and organiser which fulfilled the requirements of this rule are labelled therefore as consistent and the data 3006 organiser window is labelled as inconsistent.

By providing a consistency report detailing which rules are and are not fulfilled by data in a set of documents an overview of how well the documents fulfil consistency relationships defined by a set of consistency rules.

As a further alternative the XSL style sheet of the report generator 12 may be arranged to generate both the linked set of documents of FIG. 3 and the report of FIG. 4. In this case the report generator could be arranged so that items of data 4003–4006 appearing in the list in the report 4000 are linked via HTML links to the corresponding data within the linked set of documents so that a user may view both an overview report and data within its proper context to establish why consistency rules are or are not being fulfilled.

When an output presentation has been generated it is then necessary to ensure that the correspondence between the output presentation and the source documents is maintained. This is achieved by the monitor program 13. The monitor program 13 monitors the XML source documents to determine whether updated copies of the XML source documents have been made available on any of the computer terminals 1–4 in the distributed computer network. If an update of documents is detected the monitor program 13 is arranged to initiate the generation of a new set of links by the consistency link generator 11 and an output presentation by the report generator 12 to account for the updates made to the source documents. In this way, once an output presentation is created the correspondence between output presentation and updated source documents is maintained.

A detailed description of the content of the memory of a computer terminal having a consistency checker in accordance with the present invention stored in its memory will now be described in greater detail with reference to FIGS. 5 to 7.

Figure 5:
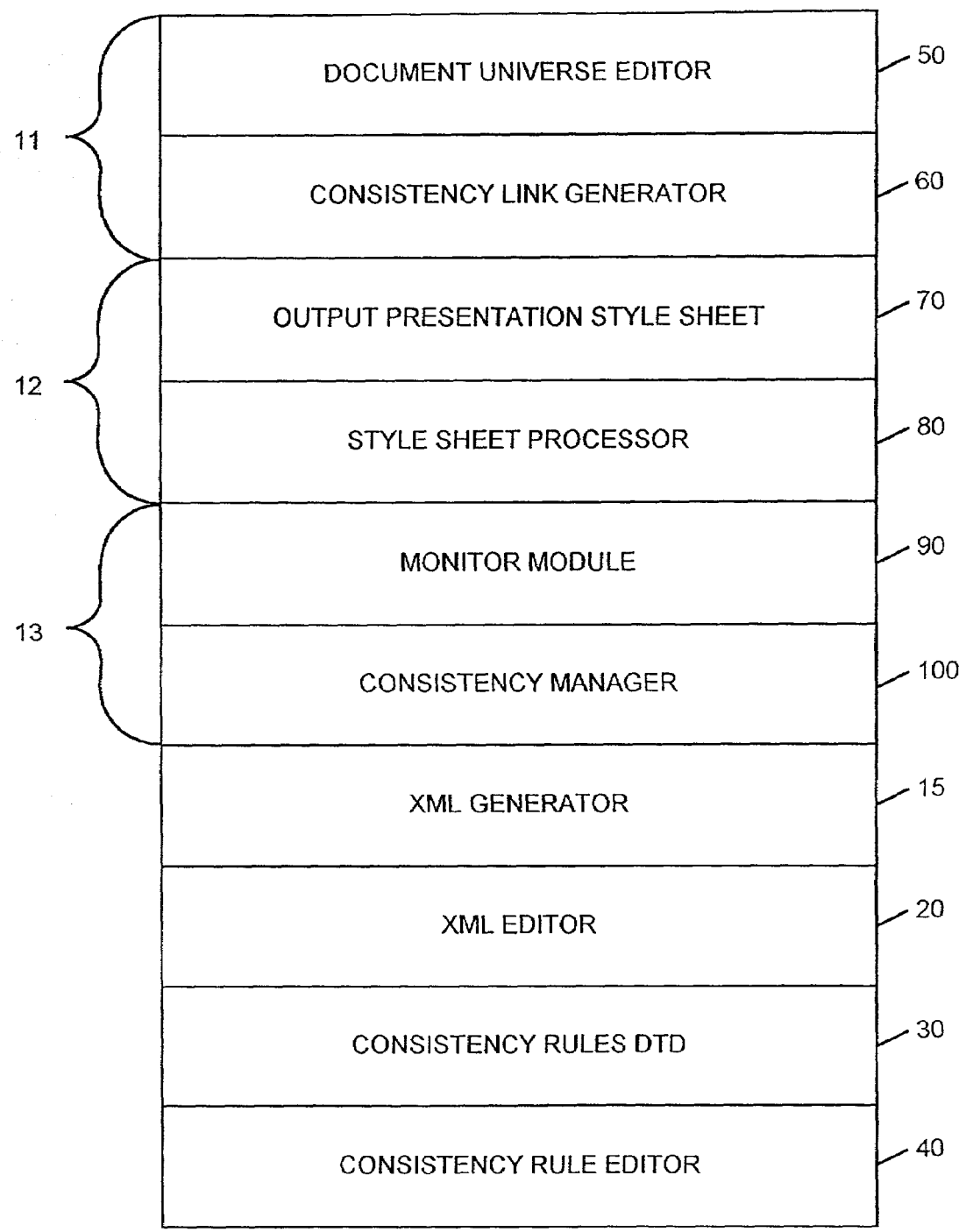
FIG. 5 is a block diagram of the memory of the apparatus of FIG. 1 having a consistency checker showing the programs and data initially stored in the memory of the apparatus.

FIG. 5 is a block diagram of programs and data for a consistency checker 10 as initially stored in the memory of the computer apparatus 4 of FIG. 1. The programs and data 11–40 initially stored in the memory will now be described.

In addition to the link data generator 11, the report generator 12, the monitor program 13 and the design document creation program 15 also stored in the memory is an XML editor 20 which comprises a standard XML editor which enables a user to create and edit XML, DTD and XSL files. The XML editor also provides an interface for enabling a user to cause XML documents to be displayed on the display 7 as text or as a tree structure, a DTD file to be displayed on the display 7 as text or as a tree structure and an XSL style sheet to be displayed on the display 7 as text or to display the output of processing of an XSL style sheet as text. In addition the XML editor also controls the loading of XML, DTD and XSL files into the memory so that they can then be edited using the keyboard 8 and mouse 9.

Also stored in the memory is a consistency rule DTD 30 which comprises a data file defining a data structure for consistency rules.

Figure 6:
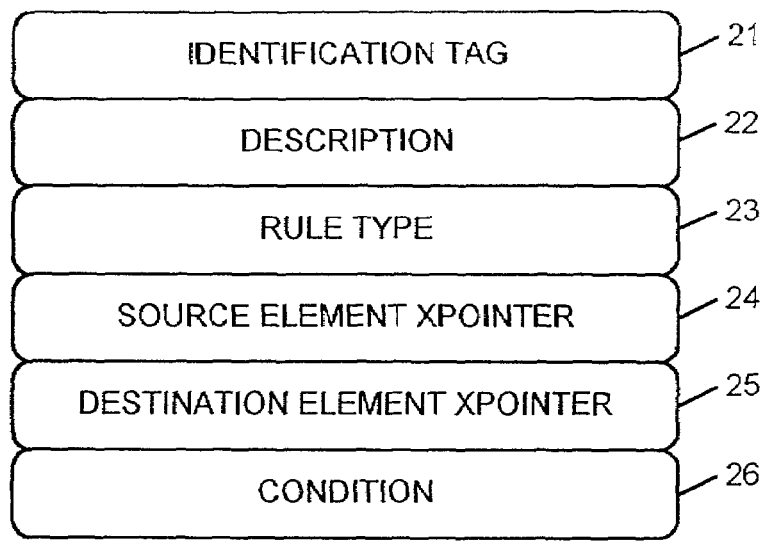
FIG. 6 is a block diagram illustrating the data structure for a consistency rule defined by a consistency rules DTD.

FIG. 6 is a block diagram of the data structure defined by the consistency rules DTD 30 stored in the memory of the computer apparatus of FIG. 4 having a consistency checker 10. The data structure defined by the consistency rules DTD 30 comprises: an identification tag 21, a text description of a consistency rule in a natural language 22, a rule type 23 as described below, X-pointers to source and destination elements 24, 25 identifying possible related elements in a set of documents and a set 26 of one or more conditions which represent the conditions of the rule to be satisfied in order to establish a consistency link between an instance of the source element and an instance of the destination element.

Thus in the previous example of a consistency rule described in relation to FIGS. 2, 3 and 4 the consistency rule, stored as data in accordance with his data structure would comprise: an identification tag 21 say for example "rule 1", a text description "For every instance in a collaboration diagram there must exist a class in an associated class diagram of the same name", a rule type 23, an X-pointer 24 to the part of the data structure of a collaboration diagram which is filled by data representing instances, an X-pointer to the part of the data structure of a class diagram which is filled by data representing classes and a condition that data found at the parts of the documents identified by the X-pointers 24,25 is required to fulfil namely that they are identical.

In this embodiment of the invention there are three rule types referred to as CT, CF and IF type rules corresponding to three different types of consistency relationships which are described below.

A CT rule is a type of rule which represents a relationship between data in documents that ought to be fulfilled by all instances of data which are to be considered to be linked. A CT rule therefore is a rule which causes two instances to be labelled as being consistent whenever a consistency condition is fulfilled by a pair of data from those instances and for data to be labelled as inconsistent if a condition does not hold for data in a document compared with any of the other data in the set of source documents.

An example of a CT type rule is the consistency rule described above that there must be a class for every instance in a collaboration diagram. This would require that for all the instances of data in a collaboration diagram there must be an equivalent class. If the class does exist for an instance, the instance in the collaboration diagram would be required to be linked to the corresponding class and labelled as being consistent. If however, there is an instance in a collaboration diagram for which no class exists this instance would be required to be labelled as inconsistent as it does not fulfil the consistency rule.

A second type of rule is a CF rule which is a type of rule which represents a relationship which does not have to be in existence but if it exists causes instances of data to be linked as consistent instances. A CF rule is therefore a rule which causes two elements to be linked if those elements fulfil a consistency relationship, but does not generate an inconsistent link if a consistency condition is not fulfilled.

An example of a CF rule for the generation of UML software design documents might be that classes with the same name in different class diagrams are considered to be identical. In this case where classes have the same name they would be required to be linked as being consistent. However there could be instances of classes that only exist in a single class diagram. The existence of such classes would not indicate that an inconsistency has occurred and hence no link would be required to be generated if such instances were to be detected.

The third type of rule type in this embodiment is an IF rule which is a type of rule which represents a relationship which must not be fulfilled by instances in associated documents. An IF rule is therefore a rule which causes two instances to be linked as being inconsistent whenever the condition of the rule is fulfilled by those instances, and for data to be labelled consistent if no other data exists which fulfils the condition.

An example of an IF rule for a UML software design document might be a closure relationship such as that for every class C1 with a sub-class C2 in a class diagram, C2 must not be a super class of C1 in another diagram. If the condition of such a rule were to be fulfilled the two instances of the class C1 and C2 would be required to be linked as being inconsistent. If, however, the condition of the rule were not fulfilled the class C1 would need to be labelled as consistent but not be linked with any particular instance of class C2.

In addition to the XML editor 20 and the consistency rules DTD 30, as shown in FIG. 5, also stored in the memory are a consistency rule editor 40 which is a program for generating and editing sets of consistency rules as will be described in detail later. The link data generator 11, report generator 12 and monitor program 13 each comprise more than a single module each of which are indicated separately in FIG. 5. These modules will now be briefly described.

The link data generator 11 stored in memory comprises: a document universe editor 50 which is a program for selecting which documents are to be processed against a given set of consistency rules; and a consistency link generator 60 which is a program for generating consistency link elements in accordance with consistency rules generated by the consistency rule editor 40.

The report generator 12 stored in memory comprises: an output presentation style sheet 70 which is an XSL style sheet for determining the presentation of an output report and a style sheet processor 80 which is an XSL processor for processing a set of XML documents, a set of consistency rules and a set of consistency link element in accordance the output presentation style sheet 70 to generate an HTML output presentation 170 which may be browsed using a standard browser.

The monitor program 13 stored in memory comprises a monitor module 90 which is a program for monitoring the modification of XML source documents for which a consistency report has been generated and a consistency manager 100 which is a program for updating an output report generated by the style sheet processor 80 to update an output report to account for changes made to a set of XML source documents.

Figure 7:
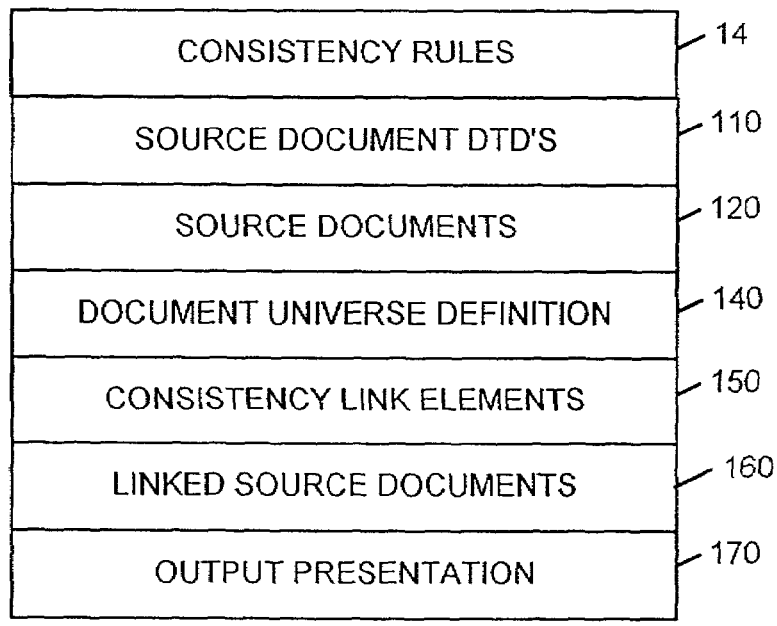
FIG. 7 is a block diagram of further data down loaded or generated by the apparatus of FIG. 1 having a consistency checker and stored in the memory of the apparatus.

FIG. 7 is a diagram of data generated and stored in memory of the apparatus 4 of FIG. 1 having a consistency checker in the course of generating an output presentation 170 in addition to the data and programs initially stored in the memory as shown in FIG. 5.

Stored in the memory are a number of source document DTD's 110 defining the data structures for source documents. A number of source documents 120 structured in accordance with the source document DTDs 110 are also stored in the memory. The source documents 120 comprise XML documents for which an output presentation 170 is to be generated.

Thus in the above described example the source documents 120 would comprise XML source documents for the UML design documents 1000,2000 and the source documents DTD 110 would comprise document type definitions for the business entities class diagram 1000 and the collaboration diagram 2000.

Also stored in the memory are a set of consistency rules 14 defining consistency relationships which should be fulfilled by data in the source documents 120; a document universe definition 140 which defines a selection of the source documents 120 stored in the memory which are to have links corresponding to consistency rules generated; consistency link elements 150 constituting the links within and between the documents; a set 160 of copies of the XML source documents in the document universe definition 140; and an output presentation 170 comprising a set of HTML output documents which can be browsed by a user as will be described in detail below.

Figure 8:
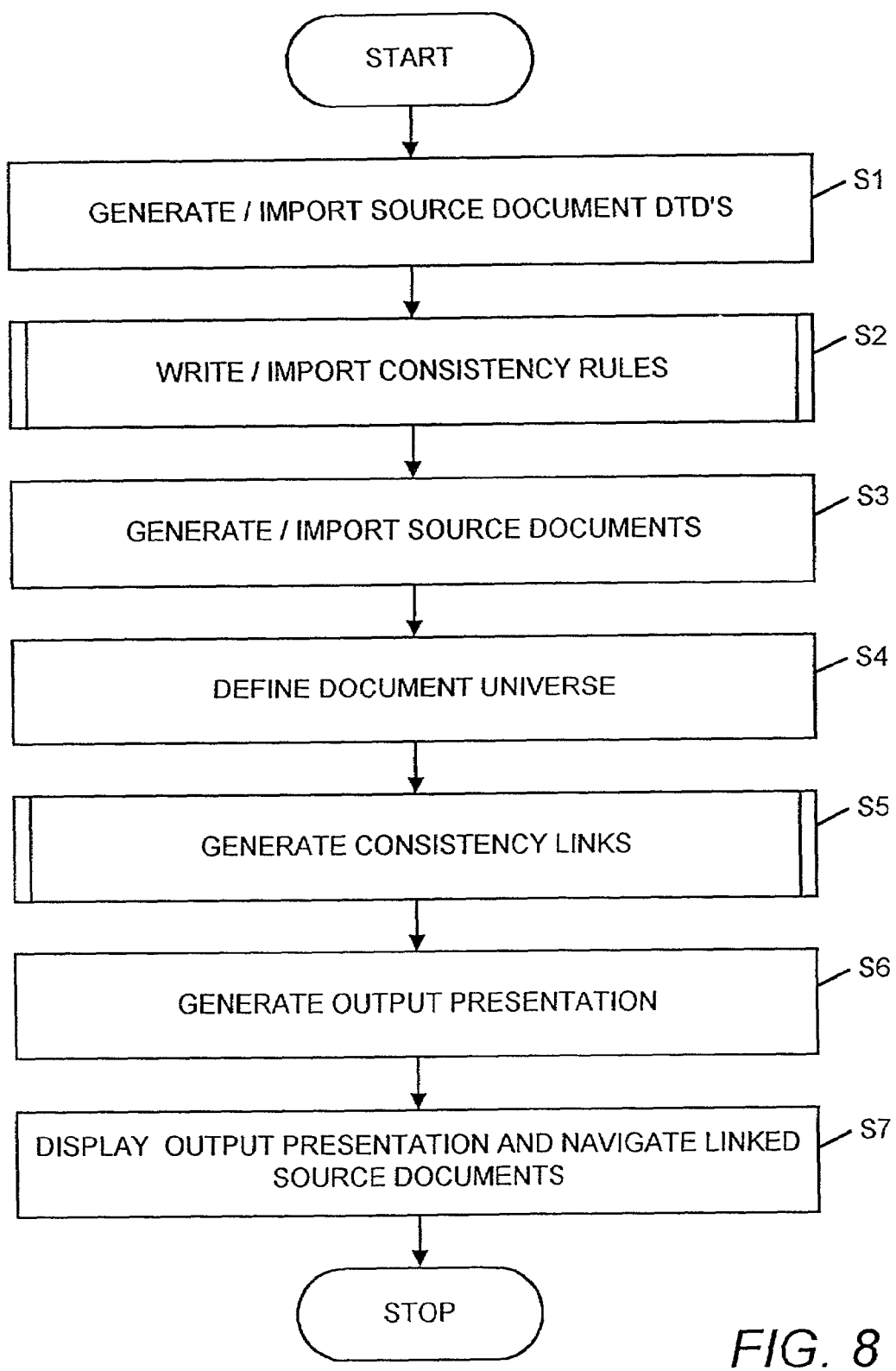
FIG. 8 is a flow diagram of the steps involved in the generation of an output presentation.

The generation of an output presentation 170 will now be described with reference to FIGS. 8–15. FIG. 8 is a flow diagram of the consistency checker 10 of computer apparatus 4 of FIG. 1 in accordance with the present invention for the generation of an output presentation.

When the apparatus is initially set up the memory has stored therein the programs and data 20–100 as shown in FIG. 5 As a first step for generating an output presentation 170, one or more source document DTD's 110 are generated or imported (s1) and stored in the memory. The source document DTD's can be generated by typing via the keyboard 8 using the XML editor program 20. Alternatively the document DTD's 110 might be imported under the control of the XML editor program 20 into the memory either via the communications network 5.

After the source document DTD's 100 have been stored in the memory, a number of consistency rules 14 are then generated or imported (s2) and stored in the memory. Consistency rules can be imported and stored in memory via the communications network 5. Alternatively, consistency rules can be generated directly by being input via the keyboard 8 using the consistency rule editor 40 stored in memory as will now be described in detail with reference to FIGS. 9 and 10.

Figure 9:
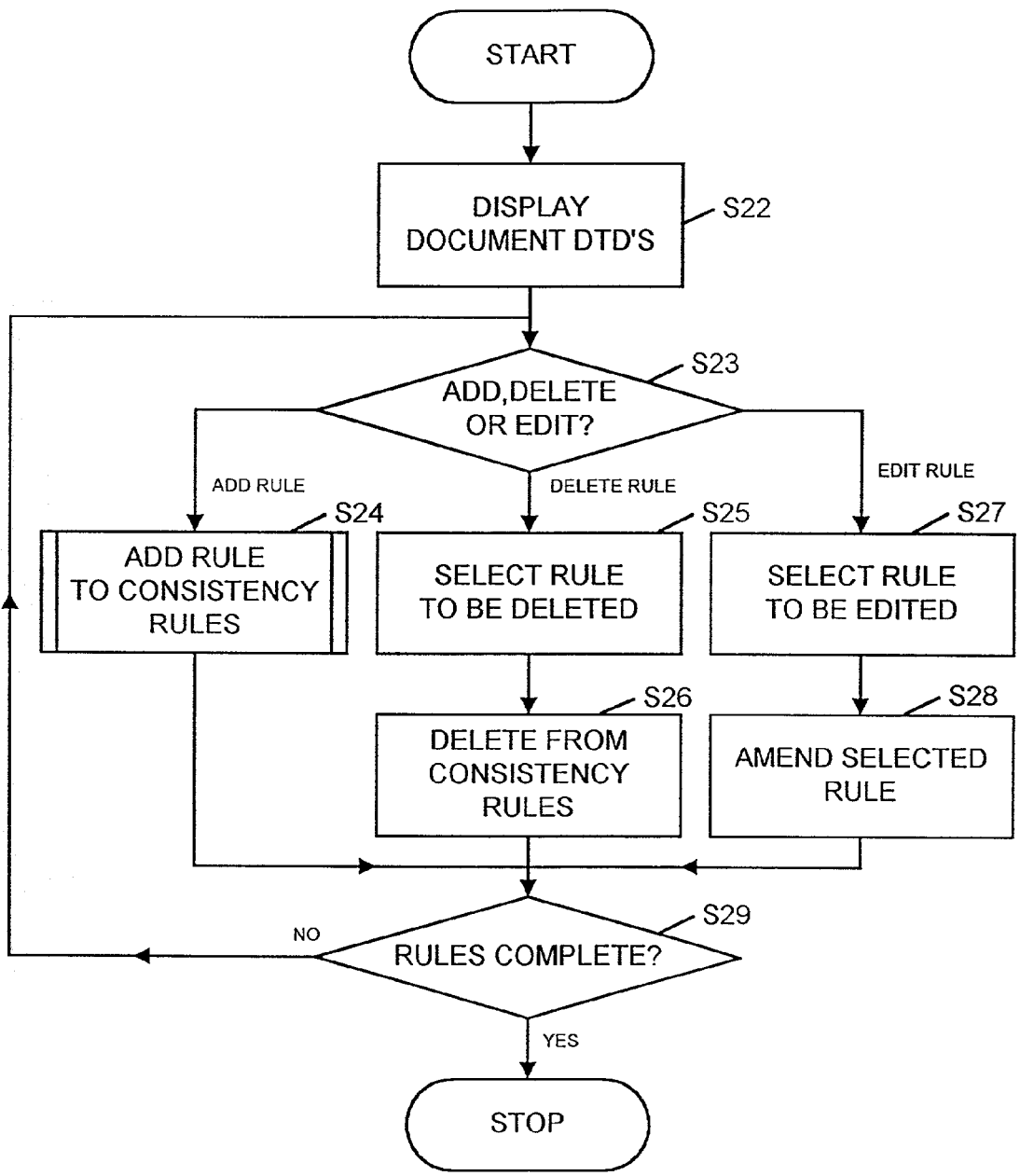
FIG. 9 is a flow diagram illustrating the generation of a set of consistency rules using a consistency rule editor.

FIG. 9 is a flow diagram of the processing of the consistency rule editor 40 for generating consistency rules. When the consistency rule editor 40 is initially invoked this causes the computer apparatus to show (s22) details of the source document DTD's 100 currently stored in the memory together with details of any consistency rules already stored in memory on the display 7. A user is then prompted to either add, delete or edit a consistency rule 14 from the rules presently stored in memory. When via the keyboard 8 or mouse 9 the computer detects (s23) that a user has input an indication of whether he wishes to add, delete or edit a rule the flow of control is changed accordingly.

If the computer detects that a user has input via the keyboard 8 or mouse 9 that he wishes to add a rule, the user (s24) is prompted to input details of a new consistency rule which is to be added to the consistency rules 14 presently stored in memory as is described in detail with reference to FIG. 10.

If the computer detects that a user has input that he wishes to delete a rule a user is prompted (s25) to select one of the rules 14 stored in memory to be deleted and the computer then deletes (s26) the selected rule from the memory.

If the computer detects (s27) that a user has input that he wishes to edit a consistency rule 14 present in the memory the user is prompted to select the rule to be edited (s27). The selected rule is then deleted from memory and the details of the rule are provided as an initial input for the input of a new rule as is described below with reference to FIG. 10. The user can then edit (s28) this initial input and the amended rule is then stored in the memory.

After a rule has been added, deleted or edited and the rules 14 stored in the memory updated accordingly, the user is prompted (s29) whether the rules are now considered complete. If a user indicates via the keyboard 8 or mouse 9 that the rules are considered complete the consistency rule editor 40 stops. If a user indicates that the rules are not yet considered complete, the updated rules 14 now stored in memory are displayed (s21) on the display once more and the user is once again prompted to add, edit or delete a rule.

Figure 10:
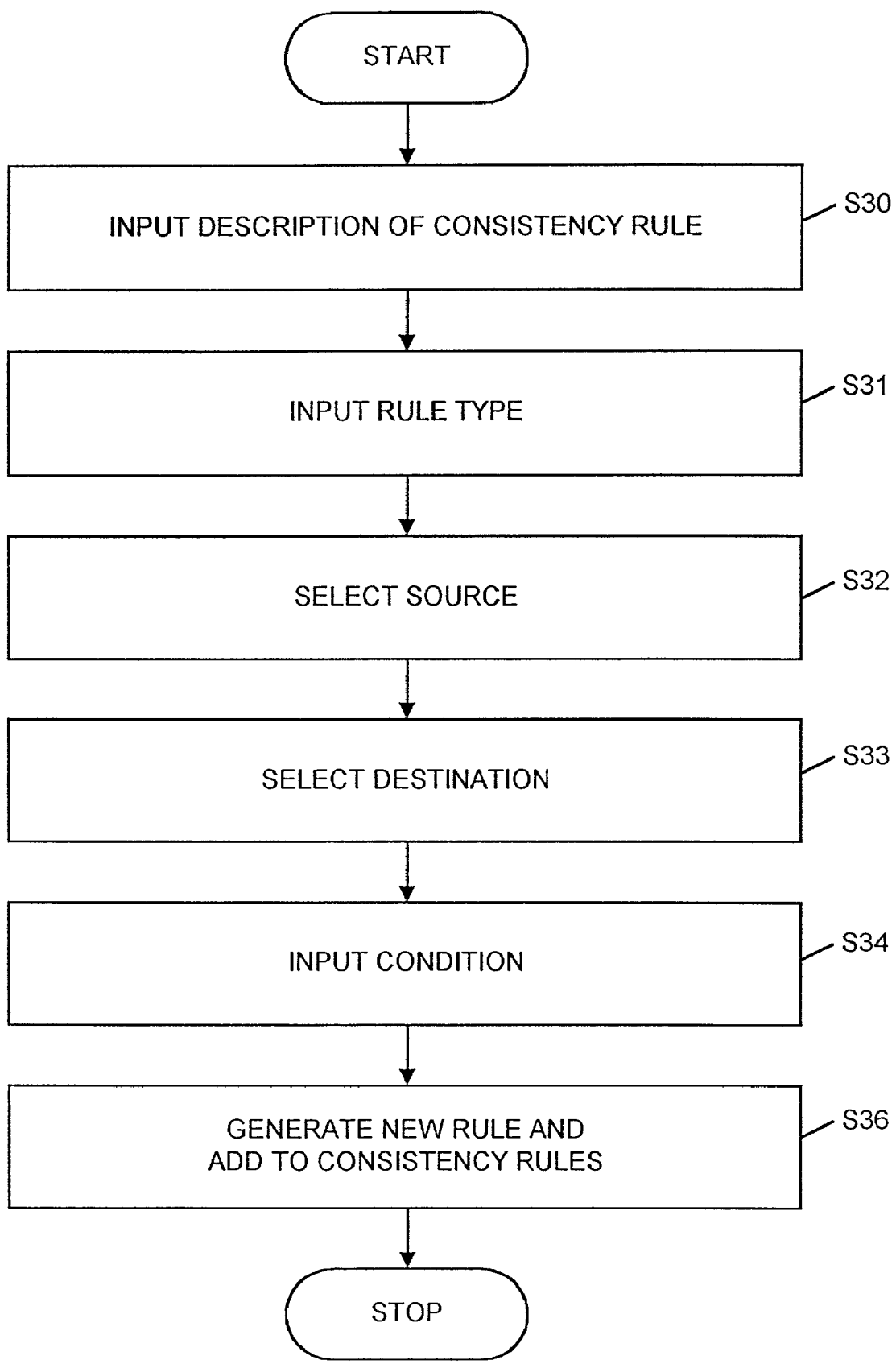
FIG. 10 is a flow diagram illustrating the steps involved in the addition of a consistency rule to a set of consistency rules using a consistency rule editor.

The following, illustrated by reference to FIG. 10, is an example of how the exemplary consistency rule discussed above in relation to FIGS. 2, 3 and 4 defining in the relationship for a set of software engineering documents produced in UML, that "for every instance in a collaboration diagram there must exist a class in a class diagram of the same name" would be generated by a user using the consistency rule editor 40.

After the computer has detected (s23) that the user wishes to input a new rule, the user is then prompted to input the natural language definition of the rule which was about to be generated. This definition is input (s30) by a user via the keyboard 8 and stored as a natural language definition of the rule. In this example the user would input "for every instance in a collaboration diagram there must exist a class in a class diagram of the same name".

The user is then prompted to enter a rule type for the new rule. Since, in this example, the rule is a rule which is to mean to hold true for all instances in a collaboration diagram in a set of documents and data within a collaboration diagram document will be inconsistent with the rule if any of the data cannot be linked with other data in a class diagram document, the type of rule CT and this type would therefore entered (s31) as the rule type.

The user then selects (s32) from the displayed DTDs for a UML collaboration diagram a portion of the DTD which would be fulfilled by data representing instances in a collaboration diagram 2000 in source documents for UML diagrams, say for example the portion of the UML DTD for such data is:

root( ).child(all,Package).(all,Collaboration Diagram).(all,Collaboration).(all,Instance).

This selection is then stored in memory.

The user then selects (s33) from the displayed DTD for a UML class diagram a portion of the DTD which would be fulfilled by data representing class data in source documents representing a UML class diagram 1000, say for example, this portion of a DTD is defined by:

root( ).child(all,Package).(all,Class Diagram).(all,Class)

This selection is then also stored in memory.

The user is then prompted to enter (s34) via the keyboard 8 the condition for the rule. In this example, the condition would be that the data found in a source document at the part of a source document to be found as an instance of the first selected portion of a DTD has the attribute class and that this is equal to the value of data found in a source document of the part of a source document to be found as an instance of the second selected portion of a DTD.

A consistency rule is then generated (s35) by the computer in XML comprising a computer generated tag 21, a text description of a rule 22 corresponding to the description input by the user, a rule type 23 corresponding to the input rule type and a pair of X-pointers 24, 25 corresponding to the first and second portions DTD selected by the user and a set of conditions 26 corresponding to the conditions input by the user.

The rule in this example generated in terms of an XML in accordance with the consistency rule DTD 30 would comprise an XML definition such as:

```
<Consistency Rule   id="rl"    type="CT">
    <id>rl</rl>
    <Description>
    For every instance in a collaboration diagram there must be
    a class in a class diagram with the same name.
    <Description>
    <Source>
        <XPointer>
        root( ).child(all,Package).(all,CollaborationDiagram).
        (all,Collaboration).(all,Instance)
        </XPointer>
    </Source>
    <Destination>
        <XPointer>
        root( ).child(all,Package).(all,ClassDiagram).(all,Class)
        </XPointer>
    </Destination>
    <Condition     expsource="origin( ).attr(CLASS)"
                   op="equal"
                   expdest="origin( ).attr(NAME)"/>
    </ConsistencyRule>
```

Although in the above example the condition to be fulfilled by a rule was a simple comparison between two values to check whether they were identical, it will be appreciated that any suitable comparison operation such as ><or ≠ could form part of a condition. It will also be appreciated that more complicated conditions involving the processing of data and comparisons with variables could instead be used.

After source document DTD's 110 and consistency rules 14 for the document types defined by the DTD's have been stored in the memory, a user is then required to generate or import (s3) source documents corresponding to the document types defined by the DTD's 110 in the memory. Either new documents can be generated using XML editor 20 or by using other application software 15 or already existent XML documents can be down loaded via the communications network 5. All the XML source documents 120 generated or inputted are then stored in the memory.

After the source documents 120 have been stored in the memory a user can then invoke the document universe editor 50. When the document universe editor 50 is invoked, a user then prompted to select from a list of source documents 120 stored in the memory those for which an output presentation 170 is to be generated. When the user has selected all the documents that he wishes to be considered for the generation of consistency links, copies 160 of the XML source documents together with associated DTD's are stored as the basis for generating an output presentation 170 and a list of those selected documents copied into memory is stored (s4) as a document universe definition 140. The document universe editor 50 then causes the consistency link generator 60 to be invoked.

In the simple example discussed in relation to FIGS. 2, 3 and 4, the XML source documents downloaded into memory would comprise XML source documents for the business entities class diagram 1000 and collaboration diagram 2000. The document universe editor 50 would enable a user to select both of these source documents and then following the selection of these two documents, copies 160 of the XML source document for business entities class diagram 1000, and the XML source document for the collaboration diagram 2000 together with their associated DTDs would be generated and stored in the memory, together with a document universe definition 140 comprising a list of the copies 160.

After the document universe definition 140 has been stored in the memory, the consistency link generator 60 is then invoked to generate a set of consistency link elements (s5).

Figure 11:
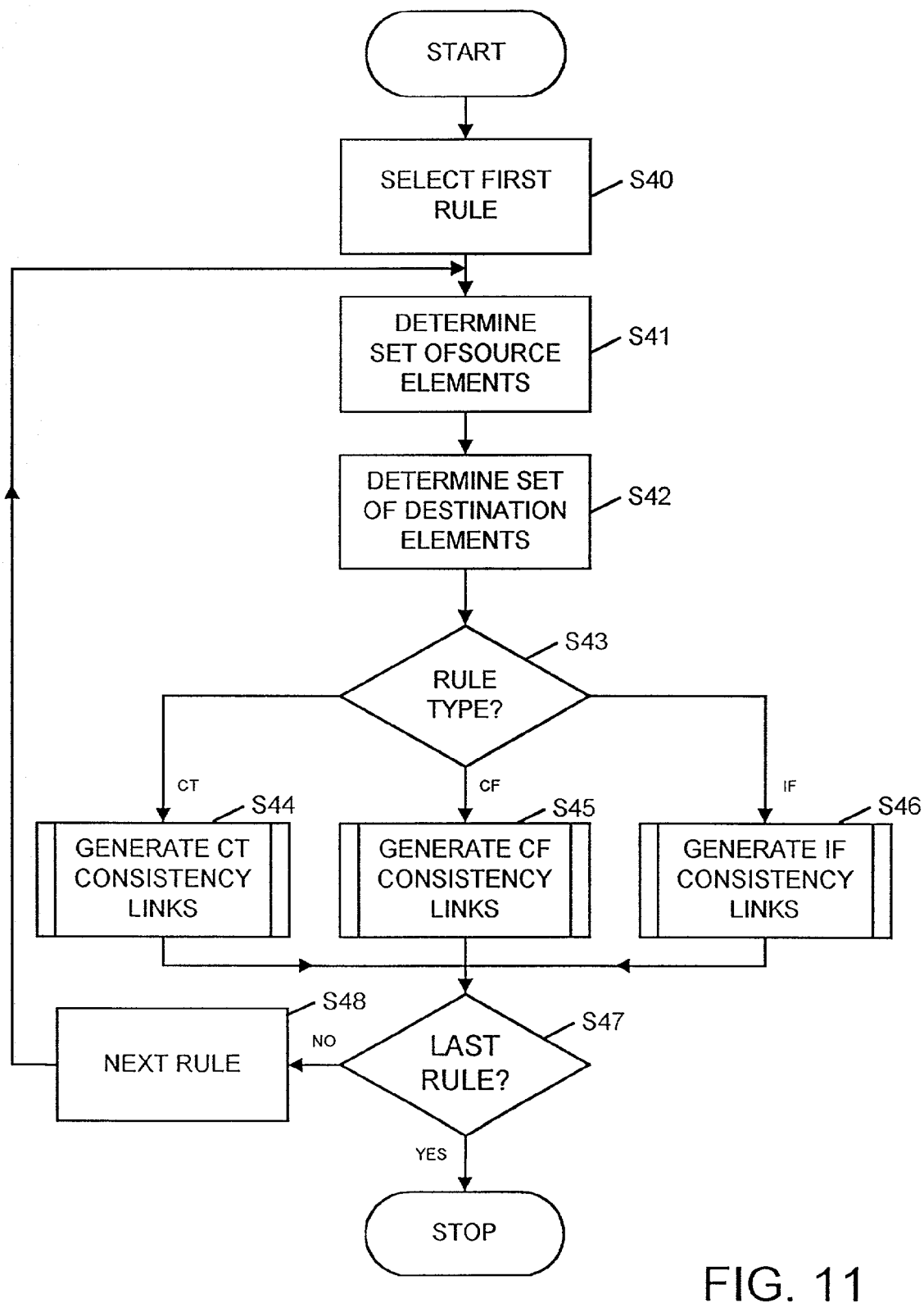
FIG. 11 is a flow diagram illustrating a generation of consistency links using a consistency link generator.

FIG. 11 is a flow diagram illustrating the processing of the consistency link generator 60. Initially, the consistency link generator 60 selects the first (s40) rule of the consistency rules 14 stored in memory. A set of source elements (expressed in X-pointer) corresponding to the first rule is then determined (s41) for each of the copies of the XML source documents 160 as listed in the document universe definition 140. This is accomplished by the computer traversing the XML data structure of each XML source document 160 in the document universe definition 140, following the source element X-pointer expression 24 for the rule currently under consideration.

Thus in the case of the exemplary rule and the documents shown in FIG. 2 as described above, the consistency link generator 60 initially will use the source element X-pointer 24 for the consistency rule under consideration to build the set of source elements for the business entities class diagram 1000 and the collaboration diagram 2000, being a set of source elements comprising expressions in X-pointer to the organiser window instance 2001, organiser instance 2002, meeting instance 2003, and date instance 2004 data in the collaboration diagram 2000.

The consistency link generator 60 then generates (s42) a set of destination elements for the rule currently under consideration in a similar manner by traversing the XML data structure of each source document 160 in the document universe definition 160 following the destination element X-pointer expression 25 for the rule currently under consideration.

Thus in the case of the exemplary rule and of the documents shown in FIG. 2 as discussed above, the consistency link generator 60 would generate a set of destination elements using the destination element X-pointer expression 25 for the rule under consideration to create a set of destination elements comprising expressions in X-pointer to the user class 1001, message class 1002, meeting class 1003, location class 1004, date class 1005, organiser class 1006, and participant class 1007 data in the business entities class diagram 1000.

The rule type (s43) of the rule currently under consideration is then determined and links of the appropriate type generated as explained below.

If the rule type is determined to be of type CT, CT consistency link data is generated (s44) as is described in detail with reference to FIGS. 12 and 13. If the rule type is determined to be of type CF, CF consistency link data is generated (s45) as is described in detail with reference to FIG. 14. If the rule type is determined to be of type IF, IF consistency link data is are generated (s46) as is described in detail with reference to FIG. 15.

When consistency links have been generated appropriate to the rule currently under consideration and stored as consistency link data 150 the consistency link generator 60 then determines (s47) whether the rule under consideration is the last of the rules stored as a consistency rule 14 in the memory. If it is determined that the rule currently under consideration is not the final rule the next rule (s48) is then considered and new lists of potential source and destination data (s41 & s42) are generated. If it is determined that the rule currently under consideration is the last rule of the consistency rules 14 stored in the memory the consistency rule editor 60 then passes control to the style sheet processor 80 to generate a set of output documents as will be described in detail later.

Figure 12:
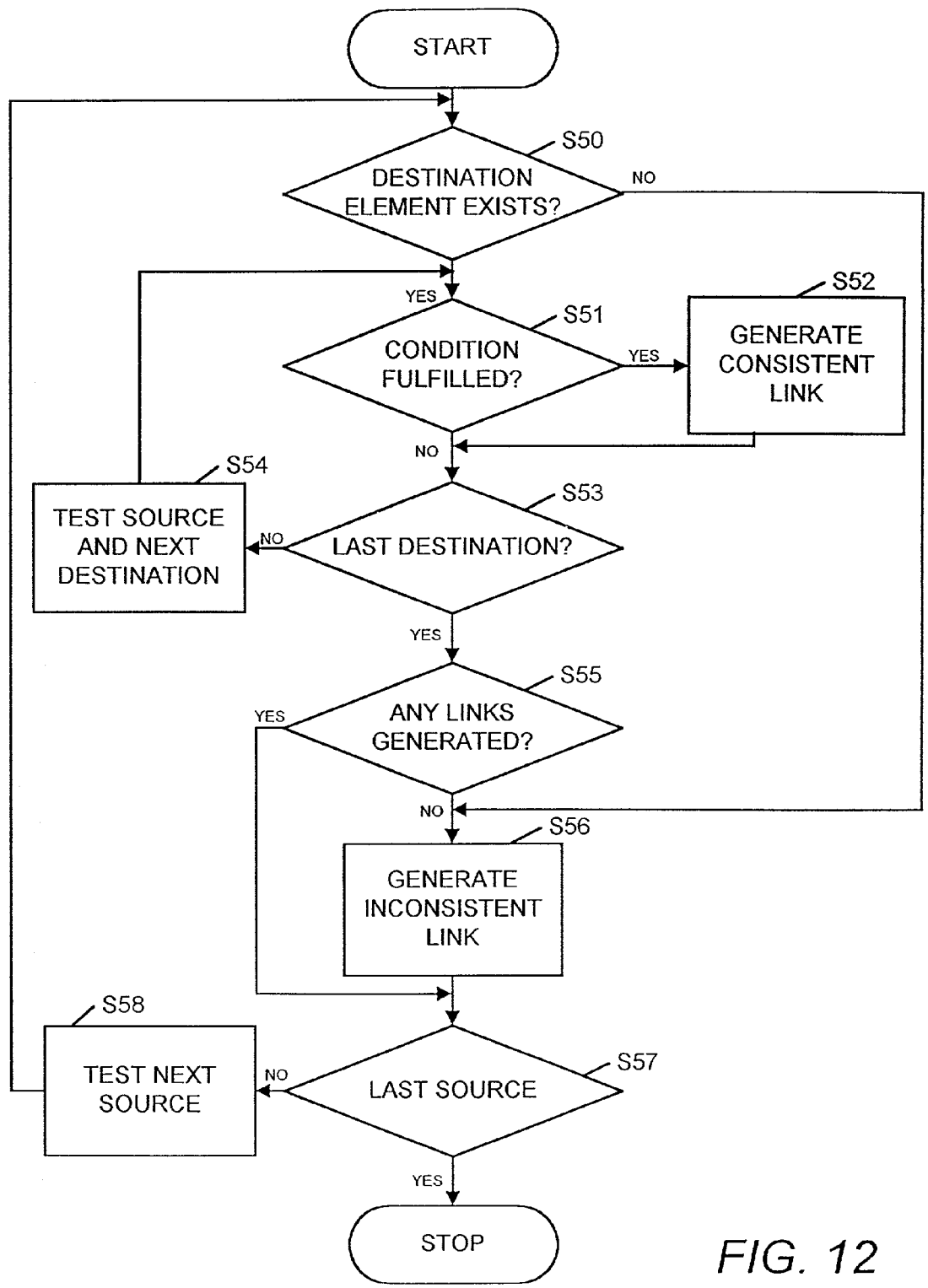
FIG. 12 is a flow diagram illustrating the generation of CT consistency links.

FIG. 12 is a flow diagram illustrating the generation of consistency links corresponding to a rule defining CT type consistency relation. As stated previously a CT type consistency relation is one which is required to be true for all instances of data that exist within the set of documents defined as the document universe definition 140.

After a set of source elements and a set of destination elements have been generated by the consistency link generator 60 (s41 and s42) and the type of the rule currently under consideration has been determined (s43) to be of a type CT, the consistency link generator 60 then determines (s50) if the set of destination elements is empty. If the destination is determined to be empty the consistency link generator 60 then generates an inconsistent link (s56) as will be described later.

If the set of destination elements is not determined to be empty the consistency link generator 60 then compares (s51) data identified by first element in the set of source elements with data identifying the first element in the set of destination elements. If the data is found to fulfil the requirements of the condition 26 for the rule currently under consideration, a consistent link is then generated (s52) and added to the consistency link elements 150 stored in memory.

Figure 13:
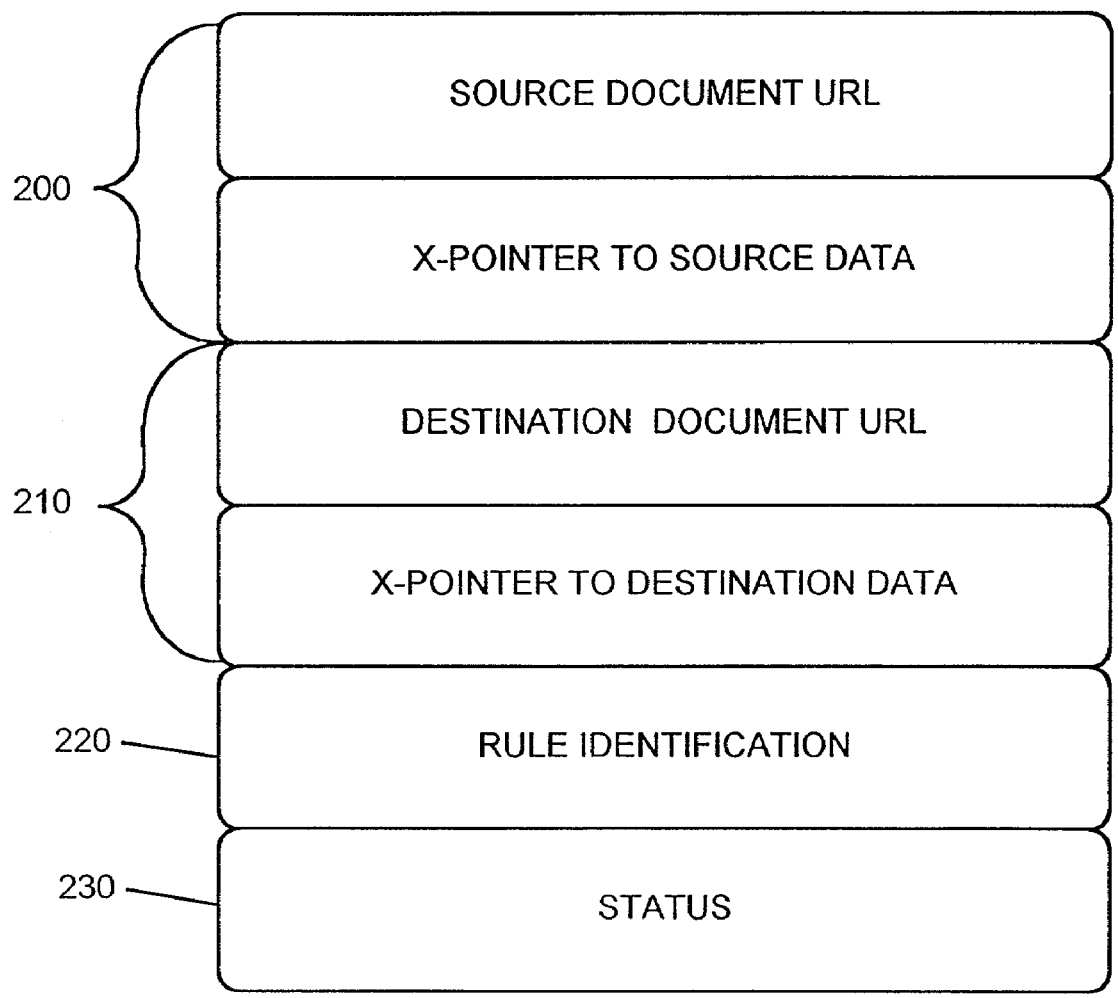
FIG. 13 is a block diagram of a data structure of a consistency link.

FIG. 13 is a block diagram of the data structure of a consistency link generated by the consistency link generator 60. A consistency link comprises a locator for a source document element 200, a locator for a destination document element 210, data 220 identifying the rule currently under consideration which has caused the link to be generated and status data 230 as either consistent or inconsistent.

When the consistency link generator 60 determines that data identified by the element currently under consideration from the set of source elements and data identified by the element currently under consideration from the set of destination elements fulfil the requirements of the condition 26 of the CT type rule currently under consideration, the consistency link generator 60 generates a consistent link in XML comprising copies 200,210 of the elements currently under consideration from the set of source elements and set of destination elements, data 220 identifying the rule currently under consideration and status data 230 indicating that the link was generated because the data linked was consistent with the identified rule.

Thus for example when the consistency link generator 60 determines that for the documents of FIG. 2 the Organiser instance 2002 in the collaboration diagram 2000, has corresponding organiser class 1006 in the class diagram 1000 when testing the consistency rule "For every instance in a collaboration diagram there must exist a class in an associated class diagram of the same name", the consistency link generator 60 generates a consistent link comprising a copy 200 of the element data from the set of source elements currently under consideration, being a URL for the XML source document for the collaboration diagram 2000 and an expression in X-pointer which points to the data representing the organiser instance 2002 in the collaboration diagram 2000; a copy of an element from the set of destination elements, being a URL for the XML source document the business entities diagram 1000, and an expression in X-pointer which points to the data representing the Organiser class 1006 in the business entities class diagram 1000; a copy of the identification tag 21 for the rule currently under consideration as identification data 220; and status data 230 labelling the consistency link as consistent.

After a consistent link (s52) has been generated or it has been determined that the data identified by the element from the set of source elements and the element from the set of destination elements does not fulfil the condition 26 of the rule under consideration, the consistency link generator 60 then determines if the element currently under consideration from the set of destination elements is the last element in the set (s53). If it is determined that the element from the set of destination elements is not the last of the elements in the set of destination elements then the consistency link generator 60 then tests data identified by the element currently under consideration from the set of source elements against the data identified by the next element in the set of destination elements and generates further consistent links if appropriate (s54, S51–S53).

If it is determined that the element currently under consideration from the set of destination elements (s53) is the last in the set of destination elements, the consistency link generator 60 then determines (s55) whether in the course of testing each of the data identified by the elements in the set of destination elements against the data identified by the element currently under consideration from the set of source elements, any consistent links have been generated. If no links have been generated the consistency link generator 60 then generates an inconsistent link (s56), which is then added to the consistency link data 150 stored in memory.

When the consistency link generator 60 generates an inconsistent link for a CT type rule, link data is generated comprising a copy 200 of the element currently under consideration from the set source elements, a null element 210, data 220 identifying the rule currently under consideration and a status data 230 indicating that the link was generated because no data existed which could be linked as being consistent with the data labelled by the link.

For example, when the consistency link generator 60 determines that for the documents of FIG. 2 the organiser window instance 2001 has not been linked with any of the class data of the business entity class diagram 1000 the consistency link generator 60 generates an inconsistent link comprising a copy 200 of the element from the source set for the data under consideration, being a URL for the XML source document for the collaboration diagram 2000 and an expression X-pointer which points to the data representing the organiser window instance 2001 in the collaboration diagram 2000, a null element 210, a copy of the identification tag 21 for the rule currently under consideration as identification data 220 and status data 230 labelling the consistency link as inconsistent.

After an inconsistent link (s56) has been generated or if any consistent links have been created for the data pointed to by the element currently under consideration from the set of source elements, the consistency link generator 60 determines (s57) whether the element currently under consideration from the set of source elements is the last element on the set of source elements. If the element currently under consideration is not the last element in the set of source elements, the consistency link generator 60 then compares the next element in the set of source elements with the first element from the set of destination elements (s58, S50–S57).

In this way the consistency link generator 60 ensures that all possible pairings of data identified by elements in the source set and data identified by elements in the destination set are considered for the generation of links and that links are generated whenever data is found which fulfils the condition of the rule under consideration, or data is identified in the source set which does not cause the generation of any consistent links.

Figure 14:
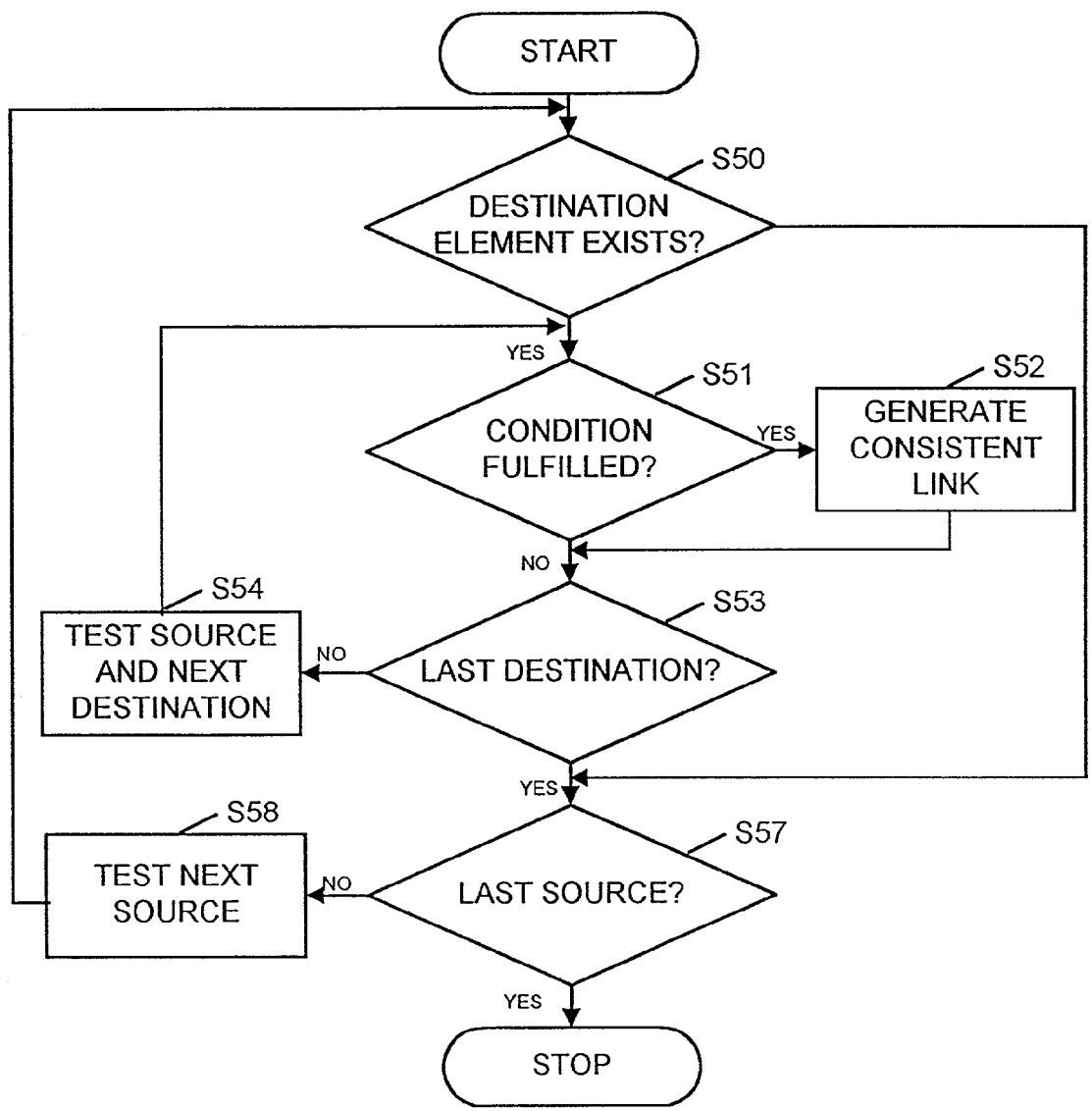
FIG. 14 is a flow diagram illustrating the generation of CF consistency links.

FIG. 14 is a flow diagram for the generation of consistency links corresponding to a rule defining a CF type consistency relation. As stated previously a CF type consistency relation is one which if data exists which fulfils a consistency rule condition, a consistency link is required to be formed. However, in contrast to a CT type consistency relation, if no data is found which fulfils the condition of a CF type consistency relation, no inconsistent links are generated.

Since, whenever data is found to exist which fulfils a consistency rule condition for either a CT or CF type consistency rule, a consistent link is generated the processing of data in accordance with a CF type rule where that data is found to fulfil a consistency rule condition is identical to the processing for a CT type consistency rule. The only difference in processing by the consistency link generator 60 between the processing of a CT type consistency rule a CF type consistency rule therefore arises, if no consistent links are generated for a piece of data identified by an element from the set of source elements.

The flow diagram of FIG. 14 is therefore identical to the flow diagram of FIG. 12 for the generation of links according to a CT type consistency rule except that in the case of a CF consistency rule when the consistency link generator 60 determines (s50) that no elements are present in the set of destination elements or no consistent links have been generated for data identified by a source element under consideration the consistency link generator 60 does not then generate an inconsistent link, rather the consistency link generator omits this step (s55,s56) and proceeds to determine (s57) whether the element under consideration from the source set is the last element in the source set and then proceeds either to compare that data identified by the next element in the source set with data identified by the destination set (s58, s50–s54) or stops.

By following a flow of control identical to that for the processing of CT type rules but omitting the step (s55–s56) of generating inconsistent links when no data is found not to fulfil the condition 26 of the rule under consideration with data identified by an element in the set of source elements, the consistency link generator 60 generates links in accordance with a consistency relationship which it is not mandatory for data in documents to fulfil.

Figure 15:
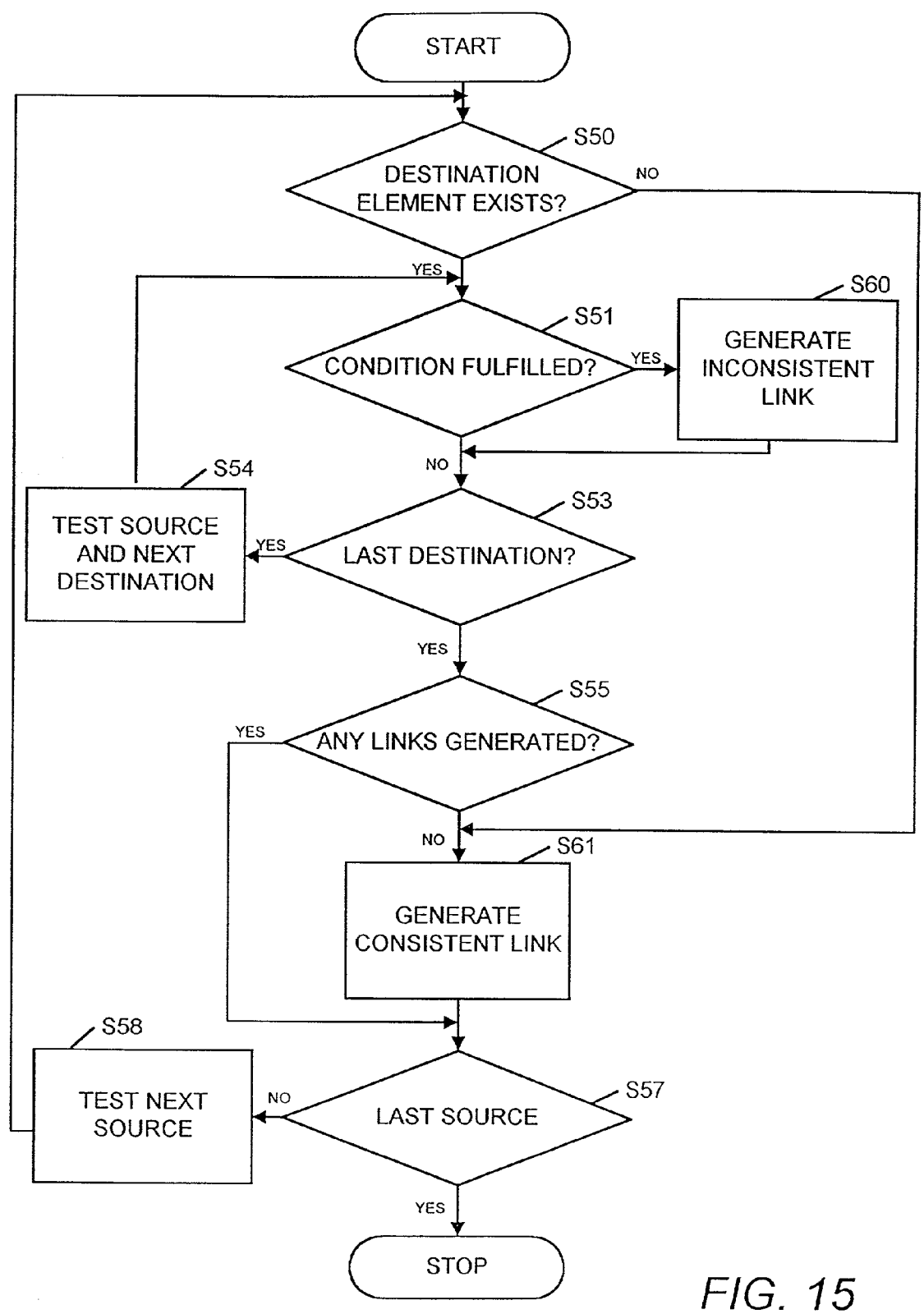
FIG. 15 is a flow diagram illustrating the generation of IF consistency links.

FIG. 15 is a flow diagram illustrating the generation of consistency links corresponding to a rule defining an IF type consistency relation. As previously stated an IF type consistency relation is one which is required not to be true for any instances of data within the set of documents defined as the document universe definition 140.

The processing of an IF type consistency rule is identical to a CT type consistency rule except that when data is identified which fulfils the conditions 26 of rule under consideration a link to the data which fulfils the condition 26 is generated and labelled inconsistent. If no data identified by the elements in the set of destination elements which fulfils the consistency condition 26 of the rule under consideration with data identified by an element under consideration from the source set, a link is made the data identified by the element under consideration from the set of source elements, labelling the data as consistent.

FIG. 15 is therefore identical to FIG. 12 except that the status of links generated in the steps when generating a consistent (s52) or inconsistent (s54) link are interchanged.

Thus inconsistent links comprising the pair of elements 200,210 under consideration from the sets of source elements and destination elements, data 220 identifying the rule under consideration, and status data 230, indicating a link was generated because data linked was inconsistent with an identified rule are generated (s60) when the data identified by the elements under consideration does fulfil the condition 26 of the rule under consideration (s51).

And, if the element under consideration is the last element in the set of destination elements and no links have already been generated for data identified by the element currently under consideration from the source set (s55) then the consistent link generator 60 generates a consistent link with status data 230, labelling the link as consistent (s61).

When the consistency link generator 60 has generated consistency link elements for all the consistency rules 14 stored in memory that relate to the source documents 160 and consistency rules 14 all the data relevant to the fulfilment of required consistency relationships is available and represented in XML.

The source documents 160, consistency rules 14, and the consistency link elements 150 are therefore passed to the style sheet processor 80 which processes them in accordance with the XSL output presentation style sheet 70 to generate (s6) an output presentation 170. The style sheet processor 80 could be any of the style sheet processors known in the art such as Microsoft MSXSL with the presentation style sheet merely identifying how the data from the source documents 160, consistency rules 14 and consistency link elements 150 are to be rendered as is well known in the art.

Thus for example, in the case of the output presentation of FIG. 3, the style sheet 70 is such as to interpret all the consistency link elements 150 as the basis for generating links 3001–3003 to the appropriate parts of HTML documents corresponding to the data of the 160 XML source documents for the UML diagrams 1000,2000. The style sheet 70 is also arranged to include in the HTML presentation labels 3004,3005 comprising the natural language description 22 for the rule identified as a rule which causes consistency link elements to be generated.

When the output presentation 170 has been generated, in accordance with the present embodiment of the present invention, the output presentation 170 generated by the style sheet processor 80 comprises an HTML file that can be viewed (s7) with a standard browser such as Netscape Navigator or Microsoft Internet Explorer.

After an output presentation has been generated for a set of consistency rules 14 and a document universe 140 it is necessary to update the output presentation whenever significant changes are made to the XML source documents referenced in the document universe definition. In this embodiment the maintenance of the correspondence of an output presentation 170 with a set of XML source documents is achieved by the monitor module 90 and the consistency manager 100 as will now be described.

Figure 16:
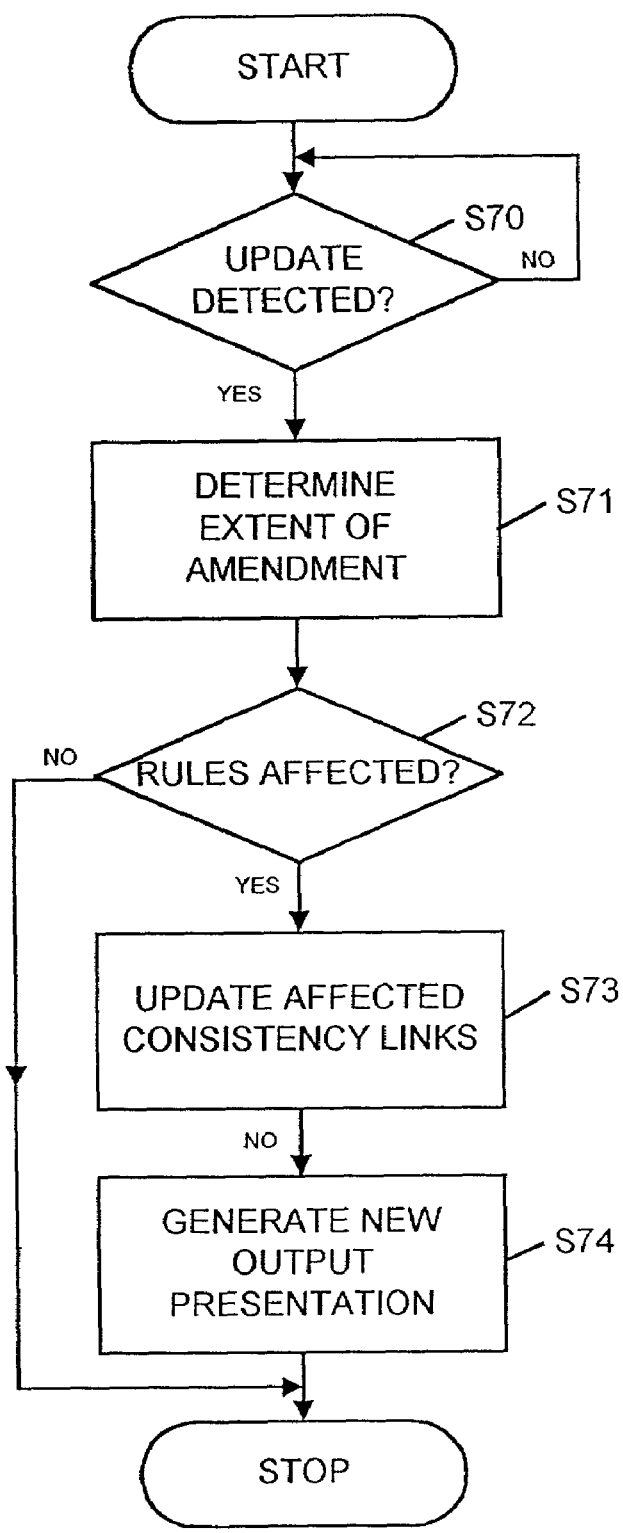
FIG. 16 is a flow diagram illustrating the processing of a watch dog program.

The processing of monitor module 90 and the consistency manager 100 for monitoring and maintaining an output presentation 170 corresponding to a set of source documents 120, is illustrated by FIG. 16.

After the generation of an output presentation 170, the monitor module 90 is arranged to monitor whether the source documents 120 stored in memory have been updated (s70). In a simple embodiment of the monitor module 90 this could be achieved by periodically checking whether the time stamp for the time of storage of a document 120 in the memory has varied, which would indicate that the previous copy of that source document had been replaced by a newer copy.

If the monitor module 90 detects that an update has occurred the monitor module 90 then determines (s71) which parts of the source document have been changed. One way in which the monitor module 90 could establish which parts of a source document have been changed would be by performing a difference operation between the source document 120 and the copy of the old source document 160 stored for the purposes of generating the output presentation 170. A suitable difference operation would be a tree difference operation such as the XML tree diff library from IBM Alpha Works.

If the updated version of the source document 120 monitored by the monitor module 90 is determined to be identical to that previously stored the difference operation will indicate that no change has occurred and no further action is undertaken. If however, the monitor module 90 does detect that a change has occurred, the monitor module 90 then invokes the consistency manager, to update the output presentation 170 stored in memory as will now be described.

When the consistency manager 100 is first invoked, the consistency manager 100, first copies the latest version of the updated source document to replace the previous version of that document.

The consistency manager 100 then compares (s72) the portion of the source document 120 which has been amended with the source element expressed in X-pointer 24 and destination element expressed in X-pointer 25 of each of the consistency rules 14 stored in memory to establish which of the consistency rules 14 relates if any to data which may have been affected by the update.

If the update detected by the monitor module 90 is determined to have potentially affect data for which consistency links may have been generated, the consistency manager 100 then (s73) invokes the consistency link generator 60 to update the consistency link data 150 in memory prior to invoking the style sheet processor 80 to generate (s74) output presentation 170 on the basis of the updated copies of source documents 160 and new set of consistency link elements. If no links are determined to be affected by the update, the consistency manager 100 stops.

In this way the checking of a set of source documents against a set of consistency rules is incremental and the output presentation 170 is made to reflect any changes made to the source documents. It is therefore possible to ensure that source documents fulfil required consistency relationships at key points within the production process.

Figure 17:
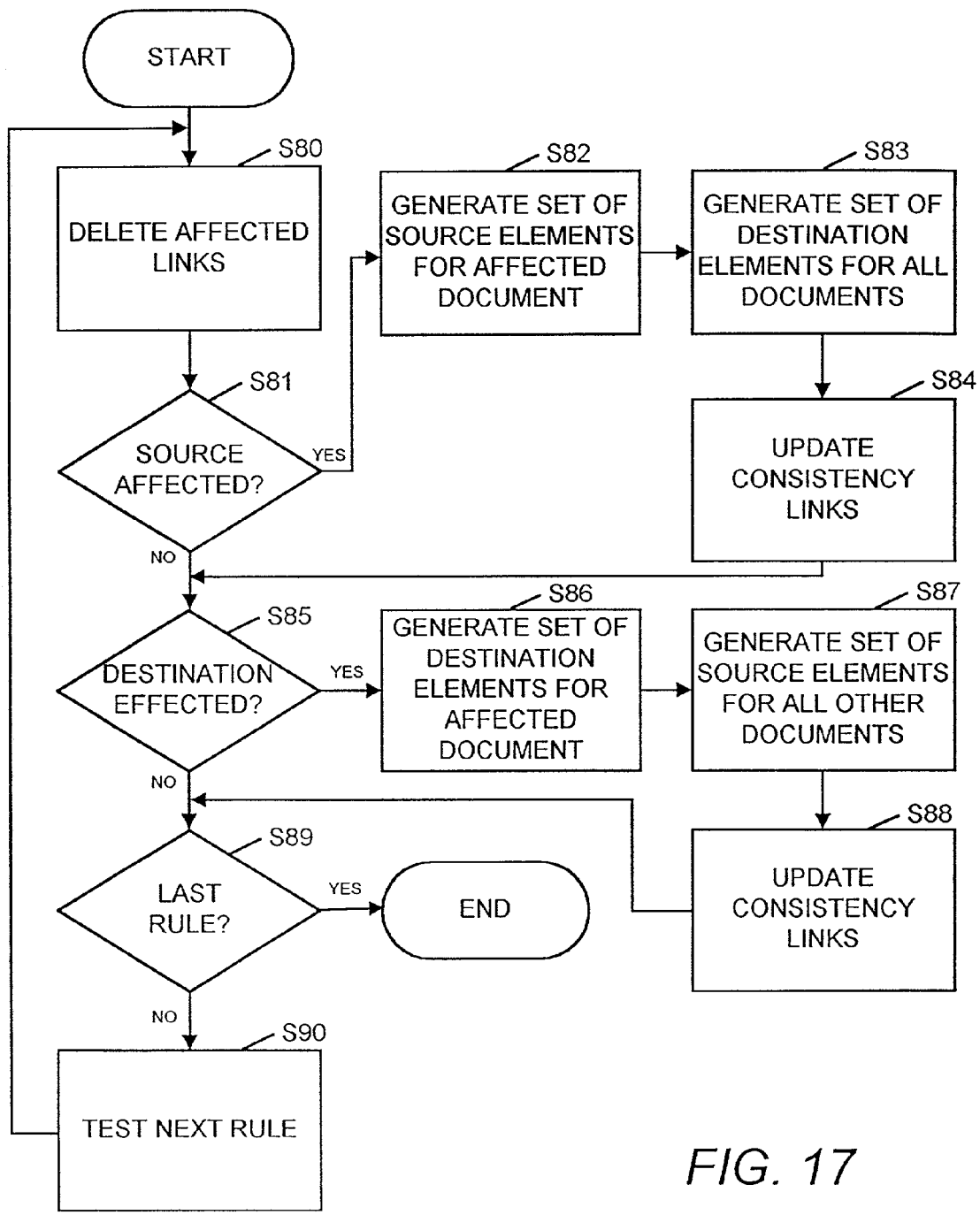
FIG. 17 is a flow diagram illustrating the processing of a consistency manager program.

FIG. 17 is a flow diagram showing in detail how the consistency manager 100 determines which consistency rules are affected by an update and instructs the consistency link generator 60 to generate an appropriate updated set of links.

When the consistency manager 100 is first invoked the consistency manager compares the data indicating the portion of the source document 120 which has been updated with the consistency link data 150. The consistency manager 100 then deletes (s80) any of the affected consistency links in the consistency link element 150. The consistency manager 100 then compares (s81) the data representing the updated portion of the document under consideration with the source element 24 of each of the consistency rules 14 stored in memory in turn. If the consistency manager 100 determines that the source element 24, of a consistency rule under consideration is such that it may refer to data which has been updated, the consistency rule under consideration is determined to be one which may have been affected by the amendment to the source document. The consistency manager 100 then generates (s82) a set of source elements for the data within the updated portion of the updated document in a manner similar to the way the consistency link generator 60 determines a set of source elements for all documents in the document universe 140. The consistency manager 100 then generates (s83) a set of destination elements for all the documents in the document universe in a similar manner to the generation of a set of destination elements by the consistency link generator 60. The consistency manager program 100 then invokes the consistency link generator 60 to generate (s84) a set of consistency links by comparing data identified by elements in the source set and destination set in accordance with the rule under consideration. These consistency links are added to the consistency link element 150 stored in memory.

After the consistency link generator 100 has generated new consistency links related to the portion of the source document which has been updated, the consistency manager 100 then determines (s85) whether the set of destination elements 25 of the rule currently under consideration may refer to data which has been updated in the source document. If the consistency manager 100 determines that the set of destination elements 25 of the consistency rule currently under consideration is such that it may refer to data which has been updated in a source document, the consistency manager 100 then generates (s86) a set of source elements for all of the other documents in the document universe 140 in a similar manner to the consistency link generator 60. The consistency manager 100 then determines a set of destination elements S87 for data within the portion of the source document which has been updated and which is identified by the destination element of the consistency rule under consideration. The consistency manager then invokes (s88) the consistency link generator 60 to generate a set of consistency links based upon a comparison identifying elements form the source set and elements in the destination set which are then added to the consistency link element 150 stored in memory.

After any further consistency links have been generated, the consistency manager then determines (s89) whether the rule currently under consideration is the last of the rules 14 stored in memory. If the rule currently under consideration is not the last of the rules stored in memory the consistency manager 100 then repeats the process of deleting and regenerating links for the next (s90, s80–s88) consistency rule stored in memory.

In this way the consistency manager deletes any consistency links which may be affected by the update of a portion of a document and then generates new consistency links for the updated portion of the document for all of the consistency rules. Then the consistency manager 100 invokes the style sheet processor 80 to generate an updated output presentation 170 to account for the changes to the XML source documents 160 and reflect the changes made to the consistency links 150.

Although a description of a distributed computer apparatus embodying the present invention has been made from which a single consistency checker has been provided it would be appreciated that one or more consistency checkers could be provided in a computer network each of which could generate their own output presentations. It would be also appreciated that consistency checkers could be provided within a server of a distributed computer network rather than being stored within a terminal. It will also be appreciated that a number of different monitor programs could be provided each of said monitor programs monitoring the update of source documents in the different computer terminals. It would also be appreciated that instead of being provided on a computer network, the consistency checker of the present invention could be provided within a single computer.

Although the previous embodiment of the present invention has been described in terms of a consistency checker in which three types of rules are supported, each of the rules involving the comparison of two pieces of data, it would be appreciated that other types of rules could also exist. In particular, it would be appreciated that instead of a comparison based upon a pair of data identified by pointers, rules based on comparisons of one or more pieces of data within structured documents could be supported. It would also be appreciated that the testing of more complex rules could involve the processing of those rules in ways other than simple comparisons for example comparisons based upon the use of variables.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When the program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

The invention claimed is:

1. A method of processing structured electronic documents for consistency, the method comprising:
   defining one or more consistency rules, each of the one or more consistency rules including at least one condition and associated with at least one pointer identifying a portion of a structured electronic document;
   utilizing the at least one pointer to identify any elements of data located within the identified portion of the structured electronic document;
   determining whether the at least one condition is satisfied based on the identified element or elements of data; and
   generating consistency link data including a locator associated with a location within the structured electronic document based upon the determination.

2. The method of claim 1, wherein the locator includes an address within the structured electronic document.

3. The method of claim 1, wherein the condition includes data defining a comparison operation.

4. The method of claim 3, wherein determining whether the at least one condition is satisfied includes determining whether an element of data fulfills the comparison operation.

5. The method of claim 3, wherein the consistency link data is generated when no elements of data are identified which fulfill the condition.

6. The method of claim 1, wherein the consistency link data further includes at least one of an indicator indicating a consistency rule within the one or more consistency rules which caused generation of the consistency link data and an indicator of the status of the determination.

7. The method of claim 6, wherein the indicator of the status includes at least one of consistent and inconsistent.

8. The method of claim 1, further comprising:
   monitoring the structured electronic documents to detect whether any of the structured electronic documents have been modified; and
   if structured documents have been modified, processing the structured electronic documents to generate new consistency link data.

9. The method of claim 8 wherein the monitoring includes determining whether a time stamp of a structured electronic document has been modified and if the time stamp of a document has been modified, determining which, if any, portions within the modified structured electronic documents have been modified.

10. The method of claim 8, wherein the generation of new consistency link data includes:
    determining previously generated consistency link data associated with the modified portions of the structured electronic documents;
    deleting any of the previously generated consistency link data determined to be data associated with the modified portions of the structured electronic documents;
    utilizing the at least one pointer to identify any elements of data located within the modified portion of the structured electronic document;
    determining whether the at least one condition is satisfied based on the identified element or elements of data; and
    generating new consistency link data including a locator associated with a location within the structured electronic document based upon the determination.

11. A computer-implemented method of generating an output presentation identifying data which does or does not fulfill the requirements of consistency rules, the method comprising:
    defining one or more consistency rules, each of the one or more consistency rules including at least one condition and associated with at least one pointer identifying a portion of a structured electronic document;
    utilizing the at least one pointer to identify any elements of data located within the identified portion of the structured electronic document;
    determining whether the at least one condition is satisfied based on the identified element or elements of data;
    generating consistency link data including a locator associated with a location within the structured electronic document based upon the determination;
    processing the consistency link data to generate an output presentation; and
    making the output presentation available to a user.

12. The method of claim 11, wherein the locator includes an address within the structured electronic document.

13. The method of claim 11, wherein processing the consistency link data includes generating an output presentation comprising a set of linked documents including one or more structured electronic documents, wherein the set of linked documents is linked on the basis of the consistency link data.

14. The method of claim 13, wherein the output presentation further includes labels associated with the consistency link data indicating a status of the determination.

15. The method of claim 14, further comprising:
    providing a natural language description of the at least one condition;
    associating the natural language description with the consistency link data,
        wherein the labels include the natural language description.

16. The method of claim 14, wherein the labels further include HTML data, based on at least one locator, facilitating navigation of the set of linked documents.

17. An apparatus for processing structured electronic documents based on consistency rules, the apparatus comprising:
    a memory including:
        instructions for receiving data defining structured electronic documents;
        instructions for storing data defining one or more consistency rules, each of the one or more consistency rules including at least one condition and associated with at least one pointer identifying a portion of a structured electronic document;
        instructions for utilizing the at least one pointer to identify any elements of data located within the identified portion of the structured electronic document;

instructions for determining whether the at least one condition is satisfied based on the identified element or elements of data; and instructions for generating consistency link data including a locator associated with a location within the structured electronic document based upon the determination; and a processor configured to execute the instructions included in the memory.

18. The method of claim 17, wherein the locator includes an address within the structured electronic document.

19. The apparatus of claim 17, further comprising a selection module operable to enable a user to select one or more structured electronic documents from structured electronic documents received by the receiver.

20. The apparatus of claim 17, wherein the condition includes data defining a comparison operation.

21. The apparatus of claim 20, wherein the processor is operable to determine whether an element of data fulfills the comparison operation.

22. The apparatus of claim 20, wherein the data generation unit is operable to generate consistency link data when no elements of data are identified which fulfill the condition.

23. The apparatus of claim 17, wherein the consistency link data further includes at least one of an indicator indicating a consistency rule within the one or more consistency rules, which caused generation of the consistency link data and an indicator of the status of the determination.

24. The apparatus of claim 23, wherein the indicator of the status includes at least one of consistent and inconsistent.

25. The apparatus of claim 17 further comprising:
a monitoring module operable to monitor the structured electronic documents received by the receiver to detect whether any of the structured electronic documents have been modified; and
an initiation module configured to process the structured electronic documents to generate additional consistency link data if structured documents have been modified.

26. An apparatus in accordance with claim 25 wherein the monitoring module is arranged to determine whether a time stamp of a structured electronic document has been modified and if the time stamp of a document has been modified, determining which, if any, portions of data within the modified structured electronic documents have been modified.

27. An apparatus in accordance with claim 25, further comprising:
a link identification unit operable to determine previously generated consistency link data associated with the modified portions of the structured electronic documents;
a deletion module operable to delete any of the previously generated consistency link data associated with the modified portions of the structured electronic documents; and
a regeneration unit operable to generate new consistency link data based on the one or more consistency rules.

28. An apparatus for generating an output presentation identifying data that may fulfill the requirements of a set of consistency rules, comprising:
a receiver operable to receive data defining structured electronic documents;
a rules store operable to store data defining one or more consistency rules, each of the one or more consistency rules including at least one condition and associated with at least one pointer identifying a portion of a structured electronic document;
an identification module operable to utilize the at least one pointer to identify any elements of data located within the identified portion of the structured electronic document;
a processor operable to determine whether the at least one condition is satisfied based on the identified element or elements of data;
a data generation unit operable to generate consistency link data including a locator associated with a location within the structured electronic document based upon the determination; and
an output generation unit operable to process the consistency link data to generate an output presentation.

29. The method of claim 28, wherein the locator includes an address within the structured electronic document.

30. The apparatus of claim 28, wherein the output generation unit is arranged to process the consistency link data and the structured electronic documents to generate an output presentation including a set of linked documents including one or more structured electronic documents, wherein the set of linked documents is linked based on the consistency link data.

31. The apparatus of claim 28, wherein the output generation unit is arranged to generate an output presentation further including labels associated with the consistency link data indicating a status of the determination.

32. The apparatus of claim 31, wherein the output generation unit is further configured to:
retrieve a natural language description of the condition;
associate the natural language description with the consistency link data,
wherein the labels include the natural language description.

33. The apparatus of claim 31, wherein the labels further include HTML data, based on at least one locator, facilitating navigation of the set of linked documents.

34. A computer readable medium with code embodied therein for performing a method, the method comprising:
receiving data defining structured electronic documents;
storing data defining one or more consistency rules, each of the one or more consistency rules including at least one condition and associated with at least one pointer identifying a portion of a structured electronic document;
utilizing the at least one pointer to identify any elements of data located within the identified portion of the structured electronic document;
determining whether the at least one condition is satisfied based on the identified element or elements of data; and
generating consistency link data including a locator associated with a location within the structured electronic document based upon the determination.

35. A computer-readable medium in accordance with claim 34 comprising a computer disc.

36. A computer disc in accordance with claim 35, wherein the computer disc comprises an optical, magneto-optical, or magnetic disc.

* * * * *